(12) United States Patent
Wysoczanski et al.

(10) Patent No.: US 10,599,585 B2
(45) Date of Patent: Mar. 24, 2020

(54) LEAST RECENTLY USED-BASED HOTNESS TRACKING MECHANISM ENHANCEMENTS FOR HIGH PERFORMANCE CACHING

(71) Applicant: Intel Corporation, Santa Clara, CA (US)

(72) Inventors: Michal Wysoczanski, Koszalin (PL); Mariusz Barczak, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 56 days.

(21) Appl. No.: 15/466,986

(22) Filed: Mar. 23, 2017

(65) Prior Publication Data

US 2018/0276139 A1 Sep. 27, 2018

(51) Int. Cl.
*G06F 12/123* (2016.01)

(52) U.S. Cl.
CPC .... *G06F 12/123* (2013.01); *G06F 2212/1024* (2013.01); *G06F 2212/604* (2013.01)

(58) Field of Classification Search
CPC .............. G06F 12/122; G06F 12/0808; G06F 12/0848; G06F 12/128; G06F 12/123; G06F 12/126; G06F 12/0866; G06F 2212/1024; G06F 2212/604
See application file for complete search history.

(56) References Cited

U.S. PATENT DOCUMENTS

| | | | | |
|---|---|---|---|---|
| 6,591,346 B1 * | 7/2003 | Kottapurath | ........... | G06F 12/123 707/999.002 |
| 6,807,619 B1 * | 10/2004 | Ezra | ..................... | G06F 12/084 711/130 |
| 7,143,393 B1 * | 11/2006 | Ezra | ..................... | G06F 12/084 717/127 |
| 7,469,320 B2 * | 12/2008 | Bonwick | ............. | G06F 12/0802 711/133 |
| 8,429,351 B1 * | 4/2013 | Yu | ....................... | G06F 12/0862 711/132 |
| 9,164,702 B1 * | 10/2015 | Nesbit | ..................... | G06F 3/067 |
| 2005/0235114 A1 * | 10/2005 | Megiddo | .............. | G06F 12/122 711/118 |
| 2006/0143396 A1 * | 6/2006 | Cabot | ................... | G06F 12/121 711/134 |
| 2007/0050548 A1 * | 3/2007 | Bali | .................... | G06F 12/0804 711/118 |
| 2014/0258628 A1 * | 9/2014 | Shivashankaraiah | ........ | G06F 12/0871 711/129 |

(Continued)

*Primary Examiner* — Yaima Rigol
(74) *Attorney, Agent, or Firm* — Viering, Jentschura & Partner mbB

(57) ABSTRACT

A method and apparatus for caching data accessed in a storage device, which include a selection of a list from a plurality of lists based on a cache block accessed from a cache memory, the cache memory being partitioned into a plurality of cache portions, each of the plurality of lists being assigned to a respective cache portion of the plurality of cache portions, each of the plurality of lists indicating an order in which cache blocks of the respective cache portion were accessed. Furthermore, a determination as to whether the accessed cache block meets a list update criteria, and an update the order in which cache blocks, assigned to the selected list, were accessed from the cache memory based on determining the accessed cache block meets the list update criteria may be included.

20 Claims, 13 Drawing Sheets

(56) References Cited

U.S. PATENT DOCUMENTS

| | | | |
|---|---|---|---|
| 2015/0088805 A1* | 3/2015 | Kakarla | G06F 16/24552 707/600 |
| 2015/0186274 A1* | 7/2015 | Kass | G06F 12/0808 711/135 |
| 2015/0379061 A1* | 12/2015 | Paraschivescu | G06F 17/30551 707/695 |
| 2016/0371193 A1* | 12/2016 | Floratou | G06F 12/0891 |

* cited by examiner

LEAST RECENTLY USED-BASED HOTNESS TRACKING MECHANISM ENHANCEMENTS FOR HIGH PERFORMANCE CACHING

TECHNICAL FIELD

Various aspects described herein relate generally to methods and devices for optimizing data retrieval, and more particularly to an enhanced cache performance architecture and cache management techniques associated therewith.

BACKGROUND

Latency associated with system memory access may be reduced by placing a certain amount of data in a cache memory. By storing data in a cache memory, it may be accessed by a processor more quickly the next time this data is requested. High-performance processor architectures, however, have been shifting toward designs that feature multiple processing cores, each having the capability of executing multiple independent threads simultaneously. As a result, shared resources, like a least recently used (LRU) list for a cache memory, may become less effective at reducing latency due to input/output (I/O) bottlenecks arising from one or more of these high processing capabilities.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
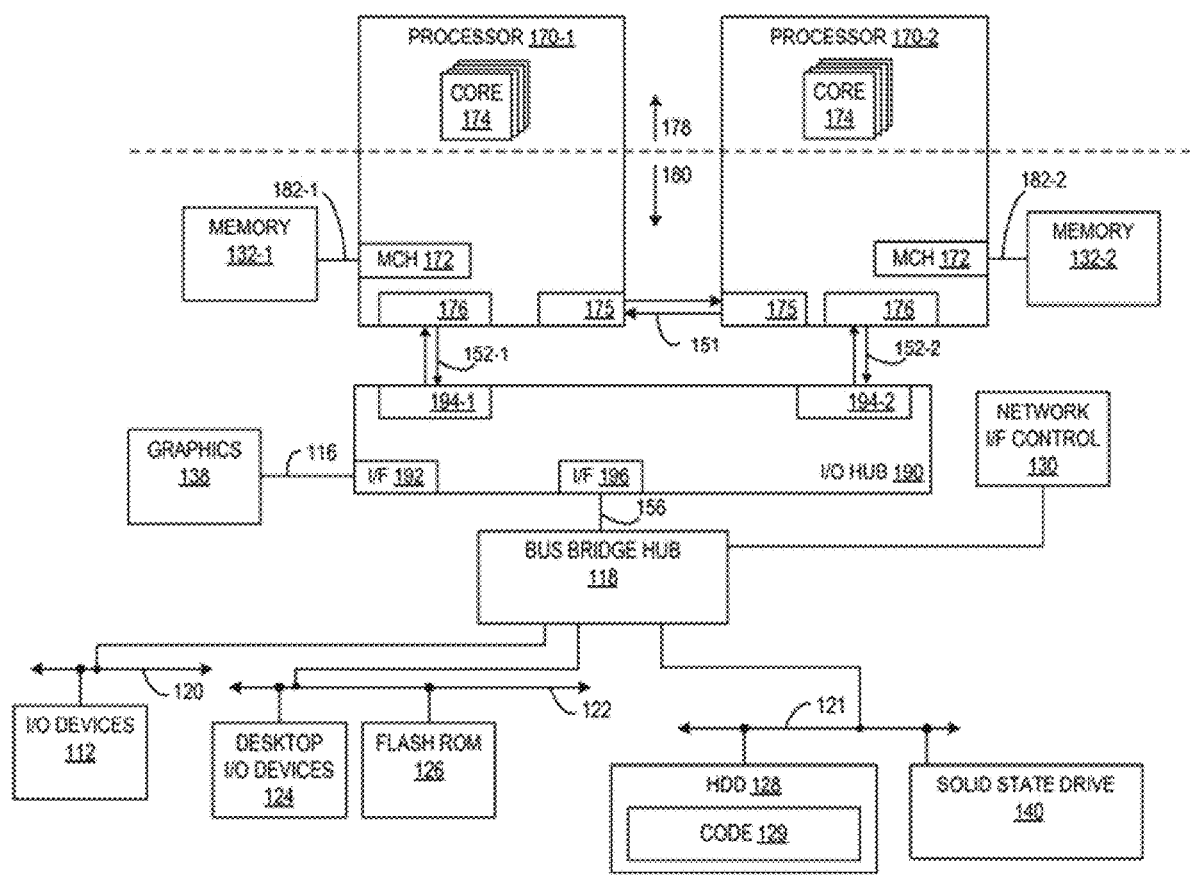
FIG. 1 shows a configuration of an exemplary computing system architecture.

The following detailed description refers to the accompanying drawings that show, by way of illustration, specific details and aspects in which the disclosure may be practiced.

Throughout the drawings, it should be noted that like reference numbers are used to depict the same or similar elements, features, and structures.

The word "exemplary" is used herein to mean "serving as an example, instance, or illustration." Any aspect or design described herein as "exemplary" is not necessarily to be construed as preferred or advantageous over other aspects or designs.

The words "plural" and "multiple" in the description and the claims expressly refer to a quantity greater than one. Accordingly, any phrases explicitly invoking the aforementioned words (e.g. "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more. The terms "proper subset," "reduced subset," and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc. Furthermore, it is appreciated that references to a "vector" may refer to a vector of any size or orientation, e.g. including a 1×1 vector (e.g., a scalar), a 1×M vector (e.g., a row vector), and an M×1 vector (e.g., a column vector). Similarly, it is appreciated that references to a "matrix" may refer to matrix of any size or orientation, e.g. including a 1×1 matrix (e.g., a scalar), a 1×M matrix (e.g., a row vector), and an M×1 matrix (e.g., a column vector).

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit." It is understood that any two (or more) of the circuits detailed herein may be realized as a single circuit with equivalent functionality or the like, and conversely that any single circuit detailed herein may be realized as two (or more) separate circuits with equivalent functionality or the like. Additionally, references to a "circuit" may refer to two or more circuits that collectively form a single circuit.

As used herein, "memory," "memory device," and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D crosspoint (3DXP), etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

A volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In some aspects, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Various aspects may be applied to any memory device that comprises non-volatile memory. In one aspect, the memory device is a block addressable memory device, such as those based on negative-AND (NAND) logic or negative-OR (NOR) logic technologies. A memory may also include future generation nonvolatile devices, such as a 3DXP memory device, or other byte addressable write-in-place nonvolatile memory devices. A 3DXP memory may comprise a transistor-less stackable crosspoint architecture in which memory cells sit at the intersection of word lines and bit lines and are individually addressable and in which bit storage is based on a change in bulk resistance.

In some aspects, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The terms memory or memory device may refer to the die itself and/or to a packaged memory product.

FIG. 1 shows a configuration of an exemplary computing system 100 architecture. In accordance with some aspects, computing system 100 may be a multi-processor system that includes a first processor 170-1 and a second processor 170-2. Although only two processors 170-1 and 170-2 are shown in FIG. 1, this number is merely selected for illustrative purposes. More or fewer processors may be implemented depending upon system resources and requirements.

Processors 170 may include a core region 178 and an integration region 180. In some aspects, core region 178 may include one or more processing cores 174, whereas integration region 180 includes a memory controller hub (MCH) 172, a processor-hub interface 176, and a processor-processor interface 175. In at least one aspect, MCH 172 may implement a cache memory controller as described herein.

In at least one aspect, processing cores 174 may each include hardware and firmware resources (not depicted) to support an execution pipeline. These resources may include, in some aspects, a cache memory (which may be shared or private) hierarchy, that may include a dedicated level one (L1) instruction cache, a dedicated L1 data cache, a level two (L2) data/instruction cache, or a combination thereof, prefetch logic and buffers, branch prediction logic, decode logic, a register file, various parallel execution resources including arithmetic logic units, floating point units, load/store units, address generation units, a data cache, I/O control logic, look-up tables, indices, and so forth.

In some aspects, MCH 172 supports bidirectional transfer of data between a processor 170 and a system memory 132 (e.g., two levels of memory (2LM), or 3DXP, or DRAM & 3DXP, etc.) via a memory interconnect 182. In at least one aspect, system memory 132 may be a DDR type DRAM, while memory interconnect 182 and MCH 172 may comply with a DDR interface specification. In at least one aspect, system memory 132-1 may represent a bank of memory interfaces (or slots) that may be populated with corresponding memory circuits for a DRAM capacity. MCH 172 may also be configured to support bidirectional transfer of data between a processor 170 and a cache memory.

In some aspects, each processor 170 includes an MCH 172 to communicate with a portion of system memory 132 and/or cache memory that is local to processor 170. In at least one aspect, system memory 132-1 is local to the first processor 170-1 and represents a portion of the system memory 132 as a whole. In some aspects, system 100 is a distributed memory multiprocessor system in which each processor 170 can access each portion of system memory 132 and/or cache memory, whether local or not. In at least one aspect, while local accesses may have lower latency, accesses to non-local portions of system memory 132 are permitted. In at least one aspect, MCH 172 may be configured to receive an I/O request to access a block of memory. MCH 172, for instance, may process a received I/O request to access the block of memory based on I/O control logic and/or an LRU list. This process may include cooperation with one or more components (e.g, drivers) identified in the received I/O request.

In some aspects, each processor 170 also includes a processor-processor interface 175 that supports communication of information with a processor-processor interface 175 of one of the other processors 170 via processor-processor interconnections 151. In some aspects, processor-hub interconnections 152 and processor-processor interconnections 151 are distinct instances of a common set of interconnections. In other aspects, processor-hub interconnections 152 may differ from processor-processor interconnections 151.

In at least one aspect, processors 170 include processor-hub interfaces 176 to communicate via interconnections 152 with an interface 194 of an I/O hub 190. Interface 194 may, for instance, communicate I/O request(s) for a cache block(s) of cache memory to processor-hub interfaces 176. In some aspects, I/O hub 190 includes a graphics interface 192 to support bidirectional communication of data with a graphics adapter 138 via a graphics interconnection 116, which may be implemented as a high speed serial bus, e.g., a peripheral component interconnect express (PCIe) bus or another suitable bus.

In some aspects, I/O hub 190 also communicates, via an interface 196 and a corresponding interconnection 156, with a bus bridge hub 118 that supports various bus protocols for different types of I/O devices or peripheral devices. In at least one aspect, bus bridge hub 118 supports a network interface controller (NIC) 130 that implements a packet-switched network communication protocol (e.g., Gigabit Ethernet), and a low bandwidth bus 122 (e.g., low pin count (LPC), I2C, Industry Standard Architecture (ISA), etc.), to support legacy interfaces referred to herein as desktop I/O devices 124 that might include interfaces for a keyboard, mouse, serial port, parallel port, and a removable media drive. In at least one aspect, low bandwidth bus 122 further includes an interface for a nonvolatile memory (NVM) device such as flash read only memory (ROM) 126, and desktop I/O devices 124 (e.g., keyboard mouse, or other I/O device, etc.). In some aspects, a storage protocol bus 121 (e.g., serial AT attachment (SATA), small computer system interface (SCSI), etc.) supports persistent storage devices including conventional magnetic core hard disk drives (HDD) 128. In at least one aspect, HDD 128 includes store code 129, which may represent processor executable instructions including operating system instructions, application program instructions, and so forth, that, when executed by the processor, cause the processor to perform operations described herein.

In at least one aspect, system 100 also includes a solid state drive (SSD) 140, and a general purpose serial communication bus 120 (e.g., USB, PCI, PCIe, NVM Express (NVMe), etc.) to support various I/O devices 112. Although specific instances of communication busses and bus targets have been illustrated and described, other aspects may employ different communication busses and different target devices.

Figure 2A:
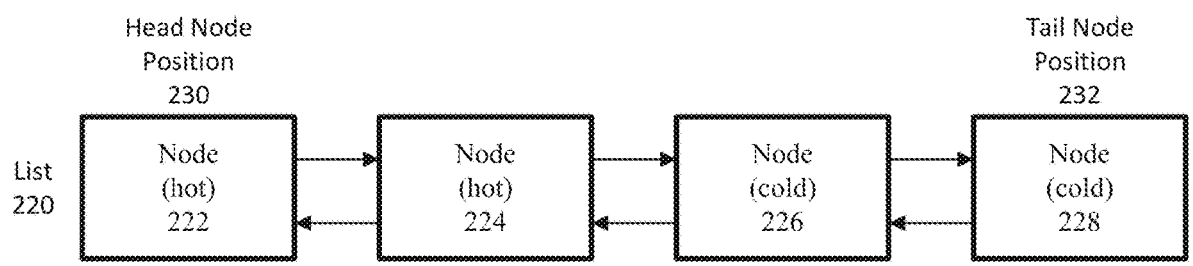
FIG. 2A shows a first cache management list implementation.

FIG. 2A shows a first cache management list implementation 200. In accordance with some aspects, the first cache management list implementation 200 includes a list 220, nodes 222-228, a head node position 230, and a tail node position 232. The list 220 may be implemented as a linked data structure, such as a doubly linked list, a queue, an array, or the like in a memory (e.g., cache memory).

Figure 3:
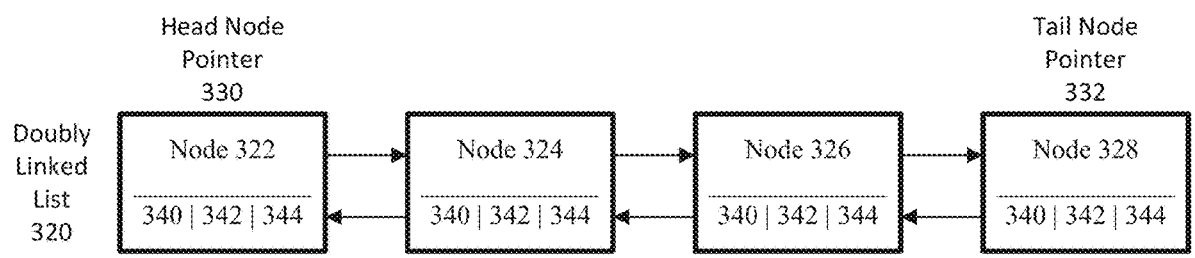
FIG. 3 shows a logical representation of a doubly linked list implementation.

FIG. 3 shows a logical representation of a doubly linked list implementation 300. In accordance with some aspects, the doubly linked list 320 contains a set of sequentially ordered nodes 322-328. Although only four nodes 322-328 are shown in FIG. 3, this number is merely selected for illustrative purposes. More or fewer nodes may be implemented depending upon system resources and requirements.

Each of the nodes 322-328 of the doubly linked list 320 comprise three fields: a link to the next node 340, a data element 342, and a link to a previous node 344. The link to the next node 340 may store an address of the next node in memory (e.g., cache memory). The link to the next node 340 may be alternatively set to a null or zero value when one of the nodes 322-328, such as node 322, does not have a next node 340 in sequence in the doubly linked list 320. The data element 342 may define an integer value, another data value type or function operable to return a data value. The link to the previous node 344 may store an address of the previous node in memory (e.g., cache memory). The link to the previous node 344 may be alternatively set to a null or zero value when one of the nodes 322-328, such as node 328, does not have a previous node 344 in sequence in the doubly linked list 320.

Head node pointer 330 may point to an address of a node of the doubly linked list 320. For instance, a head node pointer 330 may point to the address of node 322, which illustratively is at the head of the doubly linked list 320. Likewise, tail node pointer 332 may point to an address of a node of the doubly linked list 320. In one example, tail node pointer 332 may point to the address of node 328, which is depicted at the tail of the doubly linked list 320.

For a doubly linked list of integers, a node may be defined in a programming language such as C, or C++ program, Java, Ada, etc. In C or C++, for instance, a node may be defined as:

```
struct Node {
    int data;
    struct Node* next;
    struct Node* prev;
};
```

Doubly linked list 320 may interact with a hash map (not depicted). The doubly linked list 320 and hash map may be utilized by algorithms to execute a variety of list management functions and/or policies via the cache memory controller. Such functions may include the definition of a new node, removal of one of the nodes 322-328, moving or promoting of one of the nodes 322-328 to the head, tail, or other position within the doubly linked list 320.

In accordance with some aspects, an LRU may be implemented by the cache memory controller as the doubly linked list 320. The link to the next node 340 and the link to the previous node 344 may refer to address locations of respective blocks in memory (e.g., cache memory). In addition, one of the head node pointer 330 or the tail node pointer 332 is associated with a side of the doubly linked list 320 that is designated as being least frequently used. Although the side of the doubly linked list 320 having the tail node position 232 is used herein to describe the least frequently used side, the present disclosure is not so limited.

Figure 2B:
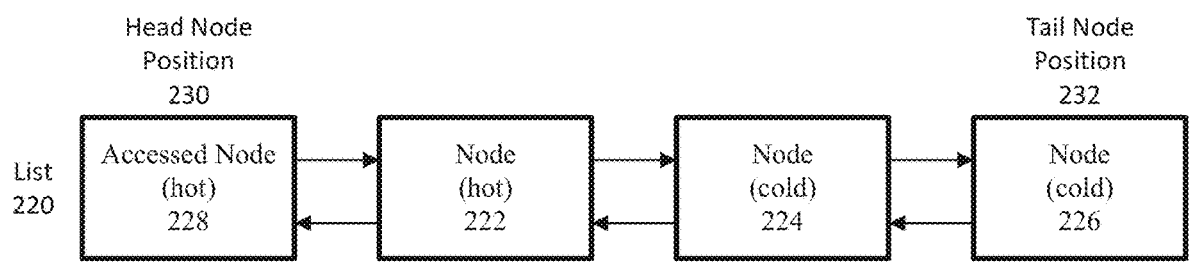
FIG. 2B shows an operation of the first cache management list implementation.

FIG. 2B shows an operation of the first cache management list implementation 200. As previously noted, the first cache management list implementation 200 includes a list 220, nodes 222-228, a head node position 230, and a tail node position 232.

In the context of an LRU implementation of list 220, the terms "hot" and "cold" are used herein to describe how recent one of the nodes 222-228 was accessed by the cache memory controller relative to the other nodes 222-228 of the list 220. Access to one of the nodes 222-228 may be provided, for instance, in response to an I/O request for a cache block referenced therefrom. Responsive to such access, node 228 may become "hot" and be promoted by the cache memory controller to the head node position 230 of the list 220. Because of node 228 being promoted, the positions of nodes 222, 224 and 226 are also updated within the order indicated by the list 220, accordingly. That is, each time one of the nodes 222-228 is accessed, list 220 is updated by cache memory controller. It is worth noting that while an LRU implementation is generally described herein, other types of algorithms, data structures, and/or policies may be used by the cache memory controller to organize cache blocks of a cache memory, such as a most recently used (MRU) or the like.

Figure 4A:
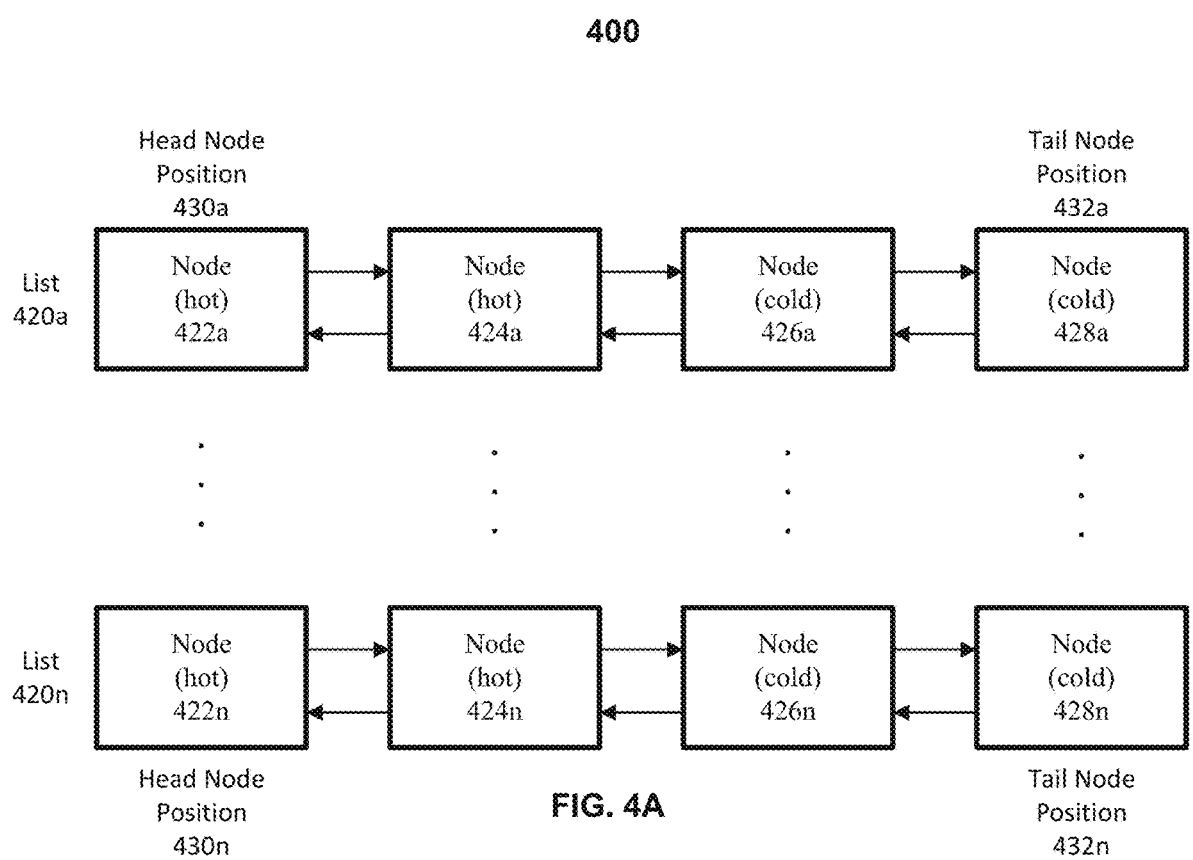
FIG. 4A shows a second cache management list implementation.

FIG. 4A shows a second cache management list implementation 400. In accordance with some aspects, the second cache management list implementation 400 includes lists $420_{a-n}$, nodes $422_{a-n}$-$428_{a-n}$, head node positions $430_{a-n}$, and tail node positions $432_{a-n}$. The same or similar components as those of the above-described first cache management list implementation 200 may be denoted by like characters, and description thereof will be omitted. In particular, each of lists $420_{a-n}$, nodes $422_{a-n}$-$428_{a-n}$, head node positions $430_{a-n}$, and tail node positions $432_{a-n}$ may respectively correspond to the list 220, nodes 222-228, head node position 230, and tail node position 232 of FIGS. 2A-2B.

Figure 4B:
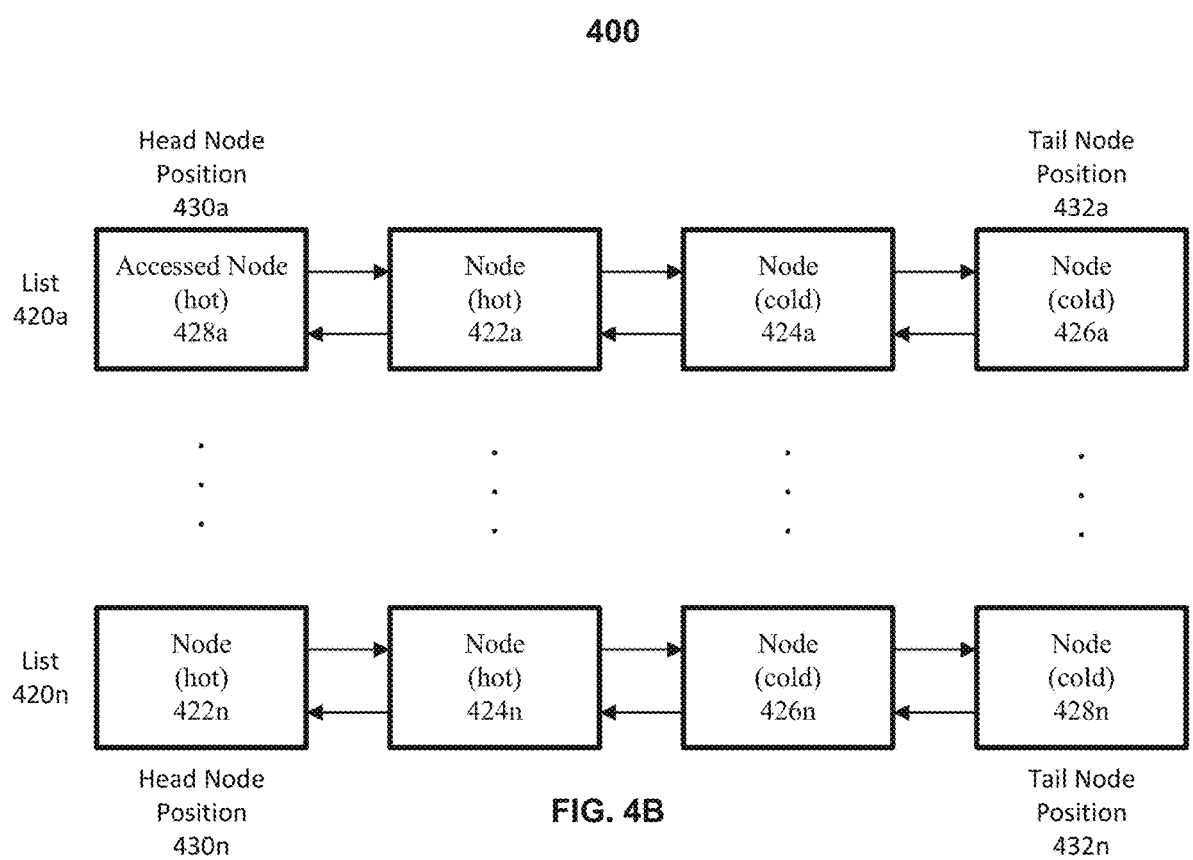
FIG. 4B shows an operation of the second cache management list implementation.

FIG. 4B shows an operation of the second cache management list implementation 400. The operation of the second cache management list implementation 400 may be distinguished from that of the first cache management list implementation 200. In one aspect, the cache memory is partitioned by the cache memory controller into a plurality of n cache memory portions of equal or different size. Each of the plurality of lists $420_{a-n}$ may thus be assigned by the cache memory controller to a respective cache portion of the plurality of n cache portions. Therefore, each of the plurality of lists $420_{a-n}$ may indicate an order in which cache blocks of the respective cache portion were accessed.

In the context of an LRU implementation of lists $420_{a-n}$, access to one of the nodes $422_{a-n}$-$428_{a-n}$ by the cache memory controller, may be provided upon, for instance, an I/O request for a cache block referenced therefrom. In response to the I/O request, the cache memory controller may select a list from the plurality of lists $420_{a-n}$ that is assigned to cache block of the cache memory. Such a selection may require the determination of an address of the cache block identified in the I/O request. To this end, the cache memory controller may use an index (e.g., look-up table) to associate the address of the cache block identified in the I/O request with one of the plurality of lists $420_{a-n}$ in determining which list to select.

According to one aspect, the selection of a list from the plurality of lists $420_{a-n}$ may be performed by the cache memory controller using following equation whenever one of the nodes $422_{a-n}$-$428_{a-n}$ is to be promoted to the head node position $430_{a-n}$:

$$L = A \bmod N \qquad \text{(Equation 1)}$$

where L is an index of the list to be used, A is a cache block index, N is the number of LRU lists, and mod is the modulo operation, such that N is greater than or equal to the number of CPU cores used for I/O submission.

Upon I/O access to the cache block referenced by node $428_a$ and selection of the list by the cache memory controller, node $428_a$ becomes "hot" and is therefore promoted to the head node position $430_a$ of the list $420_a$. As a result of node $428_a$ being promoted by the cache memory controller, the positions of nodes $422_a$, $424_a$ and $426_a$ are also updated within the order indicated by the list $420_a$, accordingly.

Figure 4C:
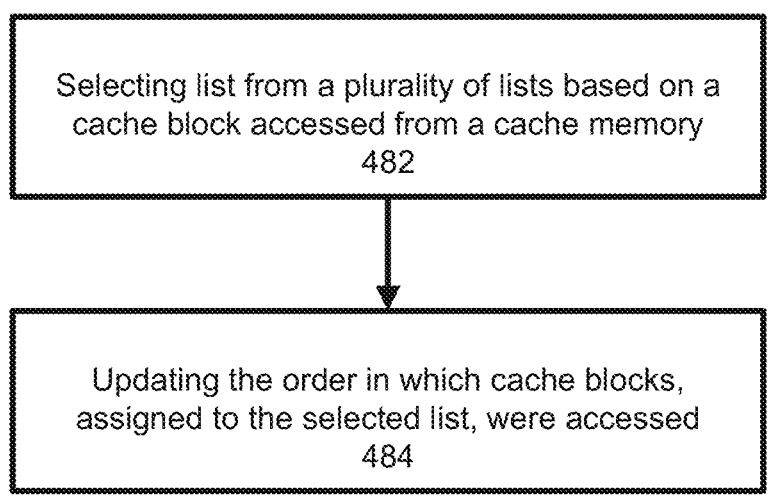
FIG. 4C shows a method of the second cache management list implementation.

FIG. 4C shows a method 480 according to one aspect of the second cache management list implementation. In particular, the method 480 for caching data accessed in a storage device, the method comprises: selecting a list from a plurality of lists based on a cache block accessed from a cache memory, the cache memory being partitioned into a plurality of cache portions, each of the plurality of lists being assigned to a respective cache portion of the plurality of cache portions, each of the plurality of lists indicating an order in which cache blocks of the respective cache portion were accessed 482; and updating the order in which the cache blocks, assigned to the selected list, were accessed based on the accessed cache block 484.

By effect of operation, another distinction is apparent between first cache management list implementation 200 and the second cache management list implementation 400. As opposed to the first cache management list implementation 200, I/O access and an update to the order of a particular list, among the plurality of lists $420_{a-n}$, is not as likely to cause a point of contention for I/O access among the plurality of lists $420_{a-n}$. Stated differently, parallel operation and update to the plurality of lists $420_{a-n}$ may aid in reducing the frequency of I/O bottlenecks at each of the lists $420_{a-n}$. Therefore, latency associated with memory access may be reduced in high-performance processor architectures.

Figure 5A:
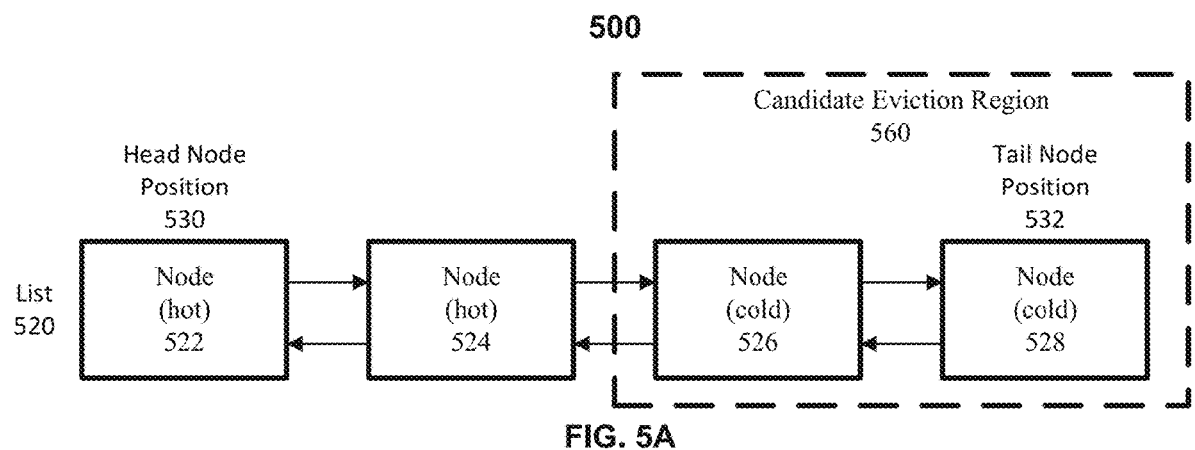
FIG. 5A shows a third cache management list implementation.

FIG. 5A shows a third cache management list implementation 500. In accordance with some aspects, the third cache management list implementation 500 includes list 520, nodes 522-528, head node position 530, tail node position 532, and candidate eviction region 560. The same components as those of the first cache management list implementation 200 may be denoted by like characters, and description thereof will be omitted. In particular, list 520, nodes 522-528, head node position 530, and tail node position 532 may respectively correspond to list 220, nodes 222-228, head node position 230, and tail node position 232 of FIGS. 2A-2B.

Figure 5B:
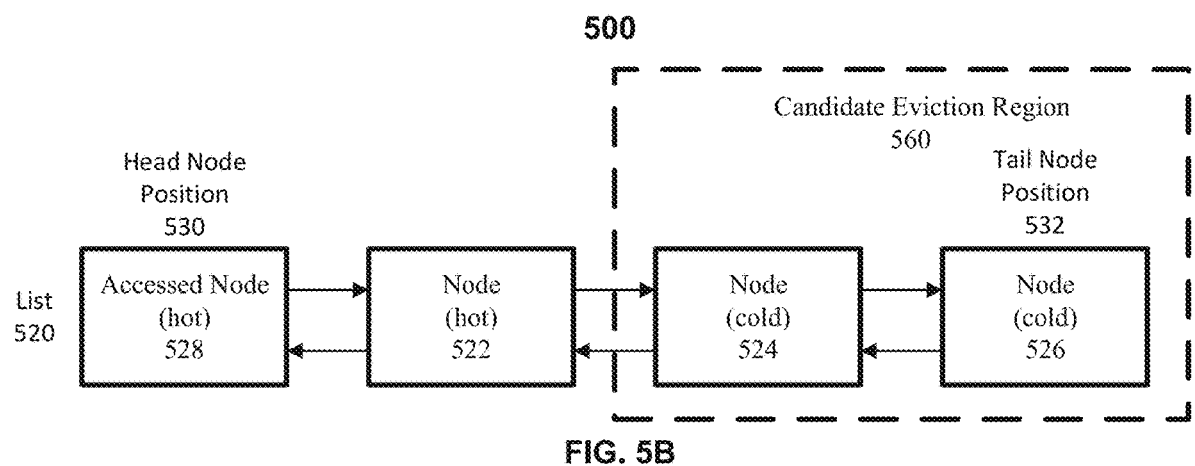
FIG. 5B shows an operation of the third cache management list implementation.

FIG. 5B shows an operation of the third cache management list implementation 500. The operation of the third cache management list implementation 500 may be distinguished from that of the first cache management list implementation 200. In one aspect, the order indicated by the list 520 is not updated for accessed nodes 522-528 based on a list update criteria of list 520. Illustratively, the effect of the list update criteria on list 520 may be visualized as the number of node(s), which lie inside/outside the candidate eviction region 560. While nodes 526 and 528 are illustrated in FIG. 5A as being within candidate eviction region 560, the present disclosure is not so limited. Candidate eviction region 560 may include more or less nodes in other implementations.

I/O access to node 524 by cache memory controller would not cause node 524 to become "hot" or promoted to the head node position 530 of the list 520 as node 524 is not included in the candidate eviction region 560 of FIG. 5A. Likewise, the positions of nodes 522, 526 and 528 are also not updated within the order indicated by the list 520 as a result of I/O access to node 524. By contrast, however, I/O access to node 528 would cause node 528 to become "hot" or promoted, by cache memory controller, to the head node position 530 of the list 520 (as reflected in FIG. 5B) because node 528 is included in the candidate eviction region 560 of FIG. 5A. Accordingly, the positions of nodes 522, 524 and 526 would be updated within the order indicated by the list 520 as a result of I/O access to node 528.

In accordance with one aspect, list update criteria may be based on the value U of a list update counter that may be modified (e.g., incremented) each time access to one of the nodes 522-528 causes the order indicated by the list 520 to be updated by the cache memory controller. Stated differently, when I/O access to one of nodes 522-528 causes the accessed node to be promoted to the head node position 530 the value U of the list update counter stored in memory is modified.

In the preceding illustration, I/O access to node 524 did not result in the order indicated by the list 520 to be updated. The value U of the list update counter, therefore, would not have to be modified in this situation. I/O access to node 528, however, would have caused node 528 to be promoted to the head node position 530 and thus the order of the list 520 to be updated. Accordingly, the value U of the list update counter would be modified in this condition.

According to another aspect, list update criteria may be based on timestamp C, which may be associated with each of the plurality of nodes 522-528. The timestamp C may indicate the value U of the list update counter when I/O access to a respective node of the plurality of nodes 522-528 causes the order indicated by the list 520 to be updated. For instance, in response to the value U of the list update counter being modified, the value of timestamp C stored in memory is set to the modified value U for the respective node that was accessed.

When a respective node of the plurality of nodes 522-528 is accessed through an I/O request, the timestamp C associated with the respective node may be read from memory. A comparison may then be performed by the cache memory controller between the value U of the list update counter and the timestamp C associated with the respective node. In some aspects, the list update criteria may be based on such a comparison. A correlation in magnitude between the timestamp C and to value U of the list update counter indicates how recent the respective node was accessed relative to the other nodes 522-528 of list 520. In particular, this comparison may be used by the cache memory controller to determine whether I/O access to the respective node among the plurality of nodes 522-528 will cause an update to the list 520 and thus a modification to the value U of list update counter.

In some aspects, the following equation may be used for such a comparison:

$$U-C>T \qquad \text{(Equation 2)}$$

It follows that the list update criteria may, in some aspects, be based on a threshold variable T stored in memory. Threshold variable T may be used by cache memory controller to select how frequently list 520 may be updated.

As the magnitude of threshold variable T increases, the number of nodes 522-528 within the candidate eviction region 560 effectively increases. By way of review, access to nodes 522-528 within the candidate eviction region 560 may cause the order of the list 520 to be updated. Statistically, this yields a higher probability that an I/O request to access one of nodes 522-528, will cause the list 520 to be updated.

As the magnitude of threshold variable T decreases, the number of nodes 522-528 within the candidate eviction region 560 effectively decreases. Statistically, this yields a lower probability that an I/O request to access one of nodes 522-528, will cause the list 520 to be updated.

In at least one aspect, when the comparison of Equation 2 is determined to be met (e.g., true) by cache memory controller, then the respective node of the plurality of nodes 522-528 accessed through the I/O request may be promoted to the head node position 530, which updates the order indicated by the list 520. Following this update, the value U of the list update counter may modified (e.g., incremented) and the timestamp C may be set to the modified value U for the respective node that was accessed before performing an eviction operation.

If, however, the comparison of Equation 2 is determined not to be met (e.g., false), then the eviction operation may be performed. During the eviction operation, any of the nodes 522-528 that are within a candidate eviction region 560 may be removed from list 520, by the cache memory controller, or replaced to make room for one or more new nodes, which represent at least one cache block of the cache memory. In at least one aspect, a node located at the tail node position 532 may be evicted from list 520 by the cache memory controller.

Figure 5C:
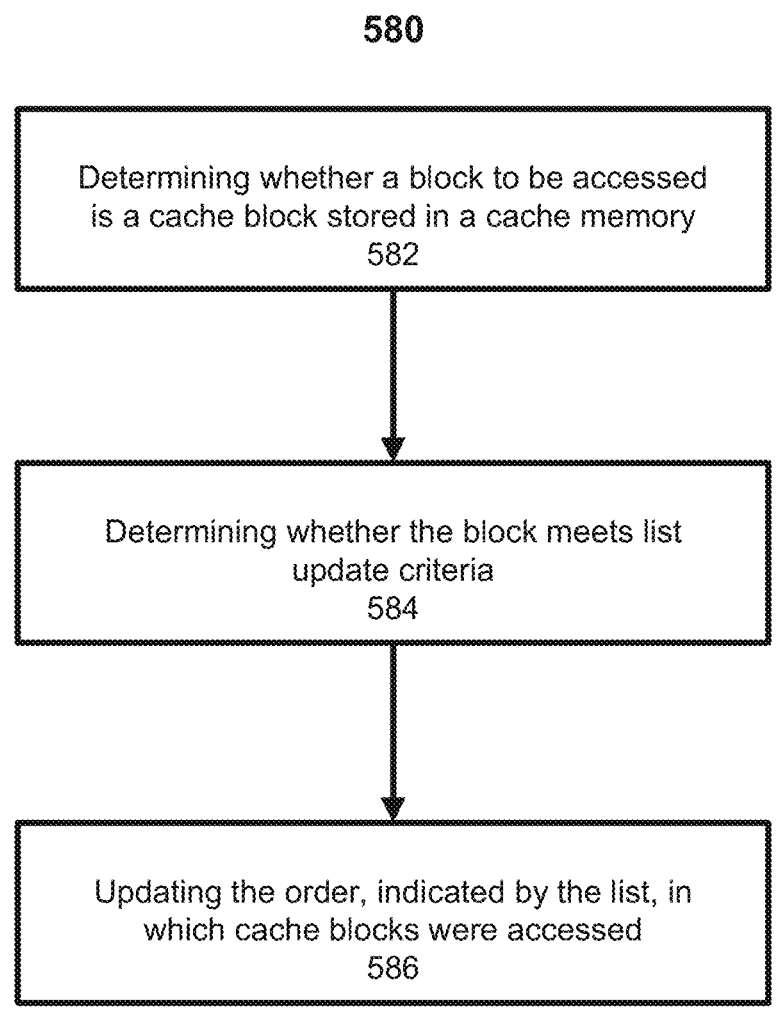
FIG. 5C shows a method of the third cache management list implementation.

FIG. 5C shows a method 580 of the third cache management list implementation. In particular, the method 580 for caching data accessed in a storage device, the method comprises: determining whether a block to be accessed from a storage device is a cache block stored in a cache memory, the cache memory having assigned thereto a list indicating an order in which cache blocks were accessed from the cache memory 582; determining whether the block meets a list update criteria in response to determining the block is a cache block among the cache blocks stored in the cache memory 584; and updating the order, indicated by the list, in which the cache blocks were accessed from the cache memory in response to determining the block meets the list update criteria 586.

By effect of operation, another distinction is apparent between the first cache management list implementation 200 and the third cache management list implementation 500. As opposed to the first cache management list implementation 200, each I/O access to one of nodes 522-528 does not cause an update to the order of list 520. Therefore, the likelihood that list 520 becomes a point of contention for I/O access is reduced. Stated differently, reducing the probability of updates to list 520 may aid in reducing the frequency of I/O bottlenecks at list 520. Therefore, latency associated with memory access may be reduced in high-performance processor architectures.

Figure 6A:
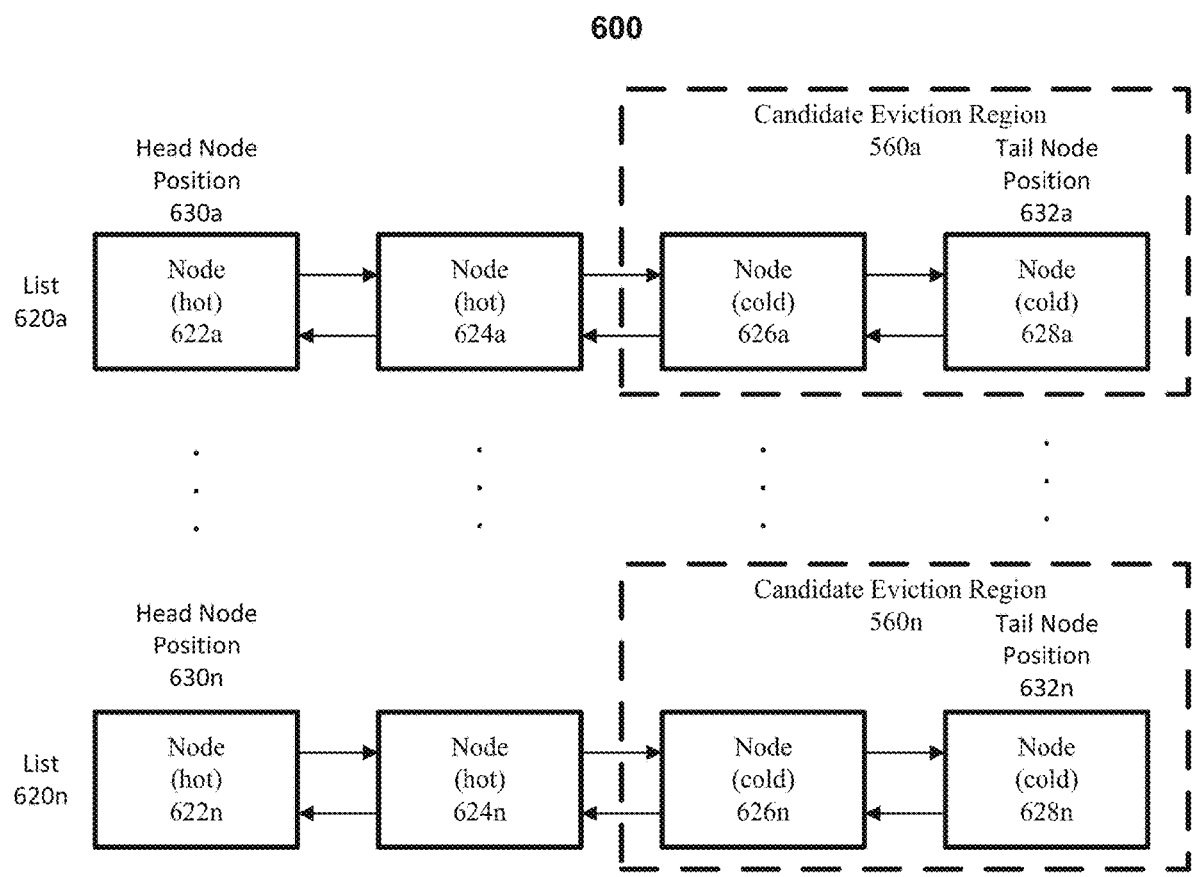
FIG. 6A shows a fourth cache management list implementation.

FIG. 6A shows a fourth cache management list implementation 600. In accordance with some aspects, the fourth cache management list implementation 600 includes lists $620_{a-n}$, nodes $622_{a-n}$-$628_{a-n}$, head node positions $630_{a-n}$, tail node positions $632_{a-n}$, and candidate eviction regions $660_{a-n}$. The same or similar components as those of the second cache management list implementation 400 and third cache management list implementation 500 may be denoted by like characters, and description thereof will be omitted. For instance, each of lists $620_{a-n}$, nodes $622_{a-n}$-$628_{a-n}$, head node positions $630_{a-n}$, and tail node positions $632_{a-n}$ may respectively correspond to lists $420_{a-n}$, nodes $422_{a-n}$-$428_{a-n}$, head node positions $430_{a-n}$, and tail node positions $432_{a-n}$. of FIGS. 4A-4B. Likewise, each of the candidate eviction regions $660_{a-n}$ may respectively correspond to a candidate eviction region 560 of FIGS. 5A-5B.

Although candidate eviction regions $660_{a-n}$ are illustrated as separate regions, candidate eviction regions $660_{a-n}$ may be configured to operate as one or more regions. For instance, each candidate eviction region of candidate eviction regions $660_{a-n}$ may operate in accordance with threshold variables $T_{a-n}$, respectively. Threshold variables $T_{a-n}$ may be set by the cache memory controller to the same value or different values. In some aspects, threshold variables $T_{a-n}$ may be set to the same value before one or more of the threshold variables $T_{a-n}$ is set to a different value responsive to an event. In at least one aspect, threshold variables $T_{a-n}$ may be set to different values before two or more of the threshold variables $T_{a-n}$ are set to a same value responsive to an event. While threshold variables $T_{a-n}$ are described herein as being separate variables, it should be noted that they may be implemented by a single variable in some aspects.

Figure 6B:
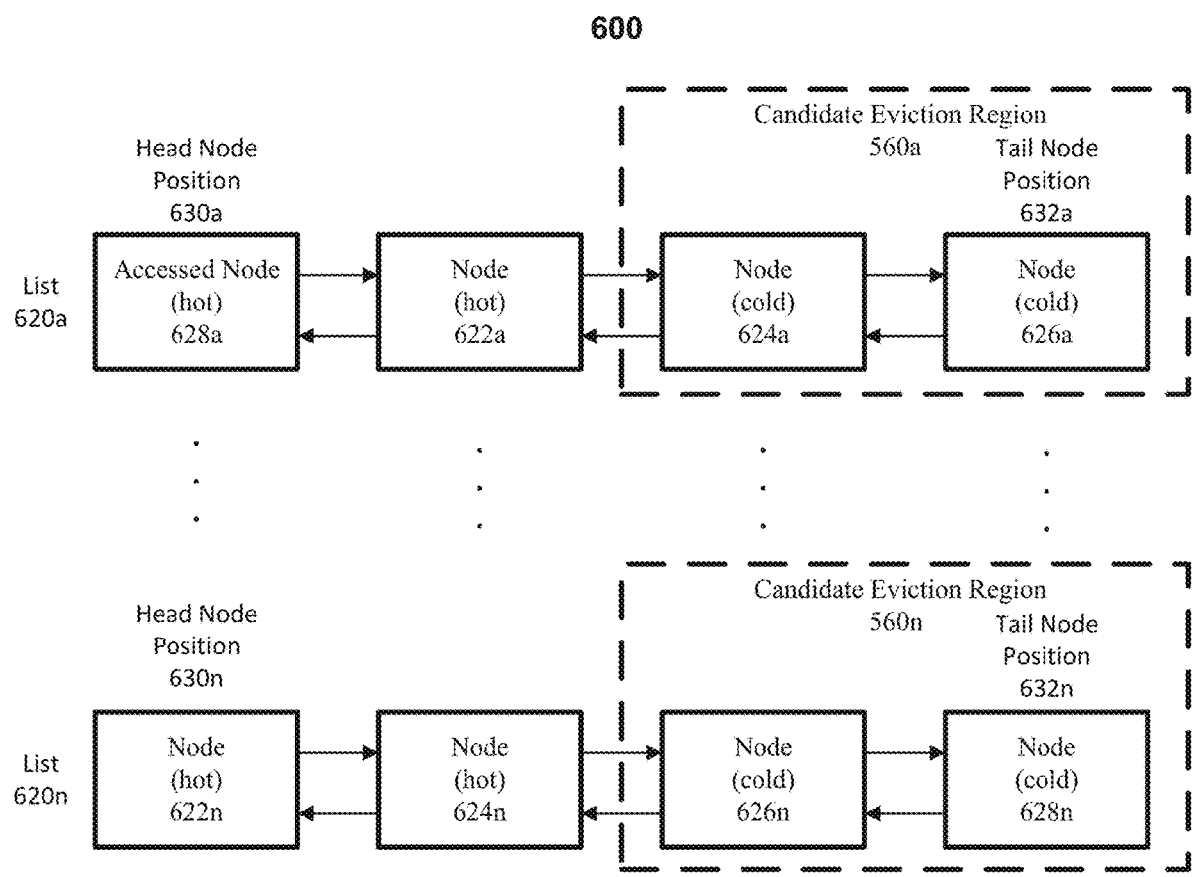
FIG. 6B shows an operation of the fourth cache management list implementation.

FIG. 6B shows an operation of the fourth cache management list implementation 600. The operation of the fourth cache management list implementation 600 may be distinguished from that of the first cache management list implementation 200. In one aspect, fourth cache management list implementation 600 harmonizes the structure and techniques of the second cache management list implementation 400 and the third cache management list implementation 500.

As in the second cache management list implementation 400, the cache memory of the fourth cache management list implementation 600 may be partitioned into a plurality of n cache memory portions of equal or different size. Each of the plurality of lists $620_{a-n}$ may thus be assigned by the cache memory controller to a respective cache portion of the plurality of n cache portions. As a result, each of the plurality of lists $620_{a-n}$ may indicate an order in which cache blocks of the respective cache portion were accessed. Provided this configuration, I/O access and an update to the order of a particular list, among the plurality of lists $620_{a-n}$, is not as likely to cause a point of contention for I/O access among the plurality of lists $620_{a-n}$. Stated differently, parallel operation and update to the plurality of lists $620_{a-n}$ may aid in reducing the frequency of I/O bottlenecks at each of the lists $620_{a-n}$. Therefore, latency associated with memory access may be reduced in high-performance processor architectures.

As in the third cache management list implementation 500, the order indicated by the lists $620_{a-n}$ are not updated for accessed nodes $622_{a-n}$-$628_{a-n}$, which fail meet the list update criteria of their respective lists $620_{a-n}$. As previously noted, list update criteria may be depicted as one or more of nodes, which lie within the candidate eviction regions $660_{a-n}$. As a result, the likelihood that lists $620_{a-n}$ will become points of contention for I/O access is reduced. Provided this configuration, the probability of updates to lists $620_{a-n}$ may be reduced, which may aid in reducing the frequency of I/O bottlenecks at lists $620_{a-n}$. Therefore, latency associated with memory access may be further reduced in high-performance processor architectures.

Furthermore, each of the plurality of n cache memory portions and/or candidate eviction regions $660_{a-n}$ may be individually or collectively controlled by cache memory controller according to various control scheme. Each control scheme may implement a set of static and/or dynamic variables (e.g., n, U, C, T) read from memory for managing one or more of the plurality of n cache memory portions and/or the candidate eviction regions $660_{a-n}$. Each of the control scheme may be triggered, paused, and/or ended in response to one or more events determined by the cache memory controller, such as a throughput level, peripheral input, hit ratio, CPU usage, number of threads, etc. Stated differently, the individual optimization of the plurality of n cache memory portions and/or candidate eviction regions $660_{a-n}$ may aid in reducing the frequency of I/O bottlenecks at lists $620_{a-n}$. Therefore, latency associated with memory access may be even further reduced in high-performance processor architectures.

Figure 6C:
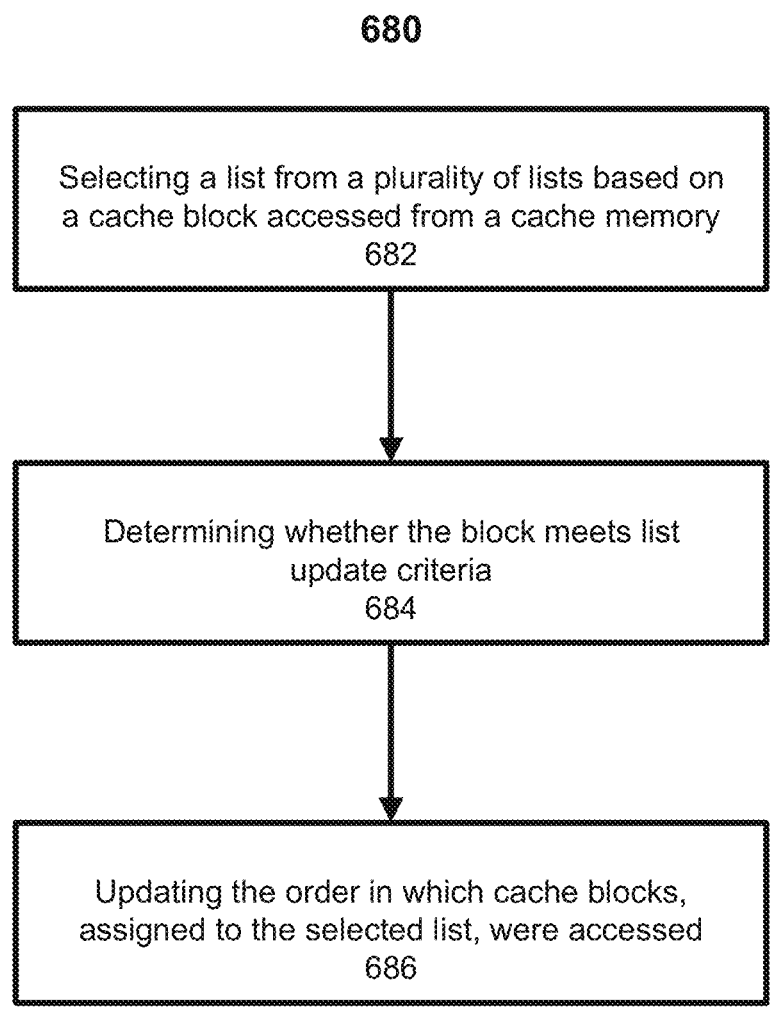
FIG. 6C shows a method of the fourth cache management list implementation.

FIG. 6C shows a method 680 of the fourth cache management list implementation 600. In particular, the method 680 for caching data accessed in a storage device, comprises: selecting a list from a plurality of lists based on a cache block accessed from a cache memory, the cache memory being partitioned into a plurality of cache portions, each of the plurality of lists being assigned to a respective cache portion of the plurality of cache portions, each of the plurality of lists indicating an order in which cache blocks of the respective cache portion were accessed 682; determining whether the accessed cache block meets a list update criteria 684; and updating the order in which cache blocks, assigned to the selected list, were accessed from the cache memory based on determining the accessed cache block meets the list update criteria 686.

Figure 6D:
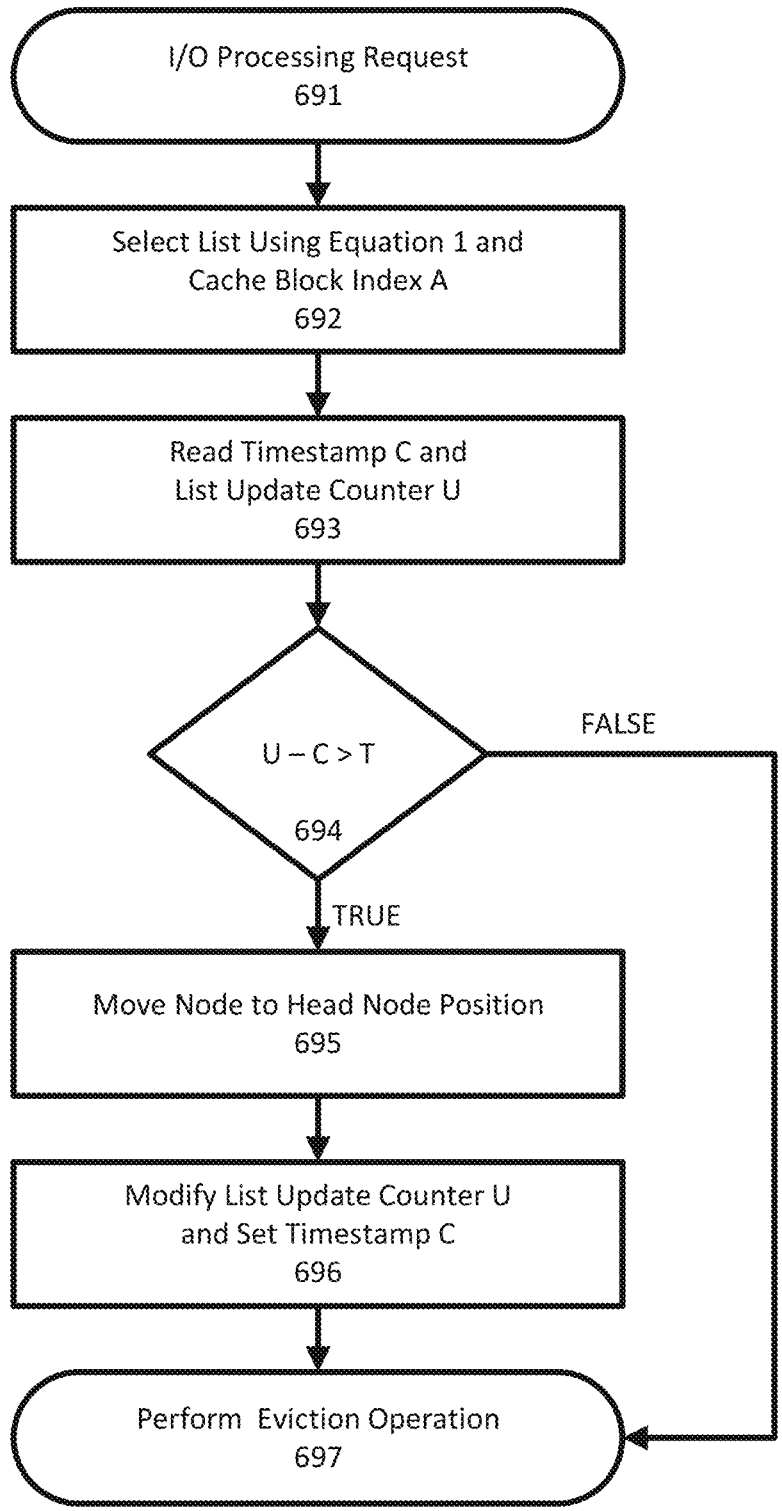
FIG. 6D shows a flow diagram of the fourth cache management list implementation.

FIG. 6D shows a flow diagram 690 of the fourth cache management list implementation 600. In some aspects, access to one of the nodes $622_{a-n}$-$628_{a-n}$, may be provided upon, for instance, an I/O request at 691 for a cache block referenced therefrom. In response to the I/O request, cache memory controller may select a list at 692 from the plurality of lists $620_{a-n}$ that is assigned to cache block of the cache memory. Such a selection may require the determination of an address of the cache block identified in the I/O request from Cache Block Index A and/or use of Equation 1. At 693, timestamp C and the value U of the list update counter may be read by the cache memory controller from memory based on the selected list from the plurality of lists $620_{a-n}$.

A comparison may then be performed by the cache memory controller at 694 between the value U of the list update counter and the timestamp C associated with the respective node at 694. In some aspects, the comparison may be made using Equation 2. If the comparison is true, the cache block referenced by the respective node becomes "hot" and may therefore promoted by the cache memory controller to the respective head node position of the selected list. As a result of respective node being promoted, the positions of nodes of the selected list also updated by the cache memory controller within the order indicated by the selected list at 695. Following this update at 696, the cache memory controller may modify the value U of the list update counter and set the timestamp C to the modified value U for the respective node that was accessed before performing an eviction operation at 697. If, however, the comparison is false, then the process would likewise perform the eviction operation at 697.

During the eviction operation 697, any of the nodes $622_{a-n}$-$628_{a-n}$ that are within a candidate eviction region $660_{a-n}$ may be removed from their respective lists $620_{a-n}$, by the cache memory controller, or replaced to make room for one or more new nodes, which represent at least one cache block of the cache memory. In at least one aspect, a node located at one of the tail node positions $632_{a-n}$ may be evicted in by the cache memory controller. Cache memory controller may select one of the lists $620_{a-n}$ for eviction based on an order of eviction (e.g., sequential, non-sequential, etc.) and/or based on the size of one of the lists $620_{a-n}$.

Figure 7:
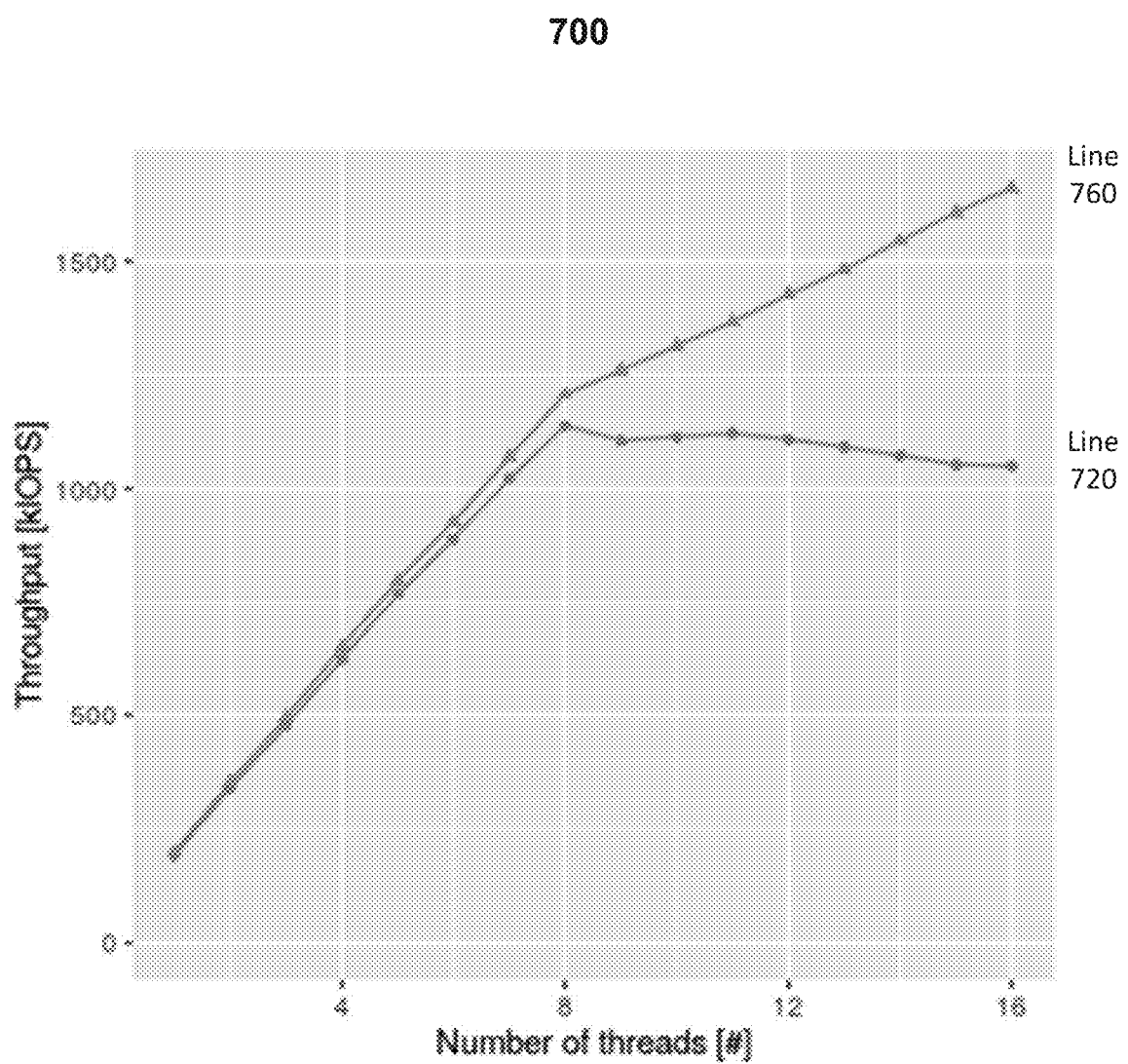
FIG. 7 shows a comparison of data throughput measurements obtained according to the first cache management list implementation and the fourth cache management list implementation.

FIG. 7 shows a comparison of data throughput measurements obtained according to the first cache management list implementation 200 and the fourth cache management list implementation 600. As illustrated in graph 700, data throughput performance of the fourth cache management list implementation 600 (line 760) began to graphically exceed that of its counterpart (line 720) in kIOps above 8 threads.

Although the several aspects and implementations are described herein with respect to a cache memory controller, the disclosure is not limited to this configuration. Additionally or alternatively, at least one or more circuits and/or processors described herein including MCH 172 or the like may be instead realized in any of preceding aspects, implementations and/or following examples.

The following examples pertain to further aspects of this disclosure:

In Example 1, a method for caching data accessed in a storage device, the method comprising: selecting a list from among a first list and a second list based on a cache block accessed from a cache memory, the cache memory comprising a plurality cache portions including a first cache portion and a second cache portion, the first list being assigned to the first cache portion and the second list being assigned to the second cache portion, the first list indicating an order in which cache blocks of the first cache portion were accessed, the second list indicating an order in which cache blocks of the second cache portion were accessed; and updating the order in which the cache blocks, assigned to the selected list, were accessed based on the accessed cache block.

In Example 2, a method for caching data accessed in a storage device, the method comprising: selecting a list from a plurality of lists based on a cache block accessed from a cache memory, the cache memory being partitioned into a plurality of cache portions, each of the plurality of lists being assigned to a respective cache portion of the plurality of cache portions, each of the plurality of lists indicating an order in which cache blocks of the respective cache portion were accessed; and updating the order in which the cache blocks, assigned to the selected list, were accessed based on the accessed cache block.

In Example 3, the method of any one of Examples 1 or 2, wherein selecting the list from the plurality of lists comprises: determining an address of the accessed cache block in the cache memory.

In Example 4, the method of Example 3, wherein selecting the list from the plurality of lists further comprises: selecting the list from the plurality of lists based on the determined address of the accessed cache block.

In Example 5, the method of any one of Examples 1 to 4, wherein selecting the list from the plurality of lists comprises: determining whether an address of the accessed cache block in the cache memory is within a table.

In Example 6, the method of Example 5, wherein selecting the list from the plurality of lists further comprises: selecting the list from the plurality of lists based on determining the address of the accessed cache block within the table.

In Example 7, the method of any one of Examples 1 to 6, wherein selecting the list from the plurality of lists comprises: determining whether an address of the accessed cache block in the cache memory is associated with the selected list within a table.

In Example 8, the method of Example 7, wherein selecting the list from the plurality of lists further comprises: selecting the list from the plurality of lists based on determining the address of the accessed cache block is associated with the selected list.

In Example 9, the method of any one of Examples 1 to 8, wherein selecting the list from the plurality of lists comprises: determining whether an address of the accessed cache block in the cache memory is associated with the selected list within a look-up table.

In Example 10, the method of Example 9, wherein selecting the list from the plurality of lists further comprises: selecting the list from the plurality of lists based on determining the address of the accessed cache block is associated with the selected list.

In Example 11, the method of any one of Examples 1 to 10, wherein updating the order in which the cache blocks, assigned to the selected list, were accessed comprises: updating the order in which the cache blocks, assigned to the selected list, were accessed in response to the cache block being accessed.

In Example 12, the method of any one of Examples 1 to 11, wherein updating the order in which the cache blocks, assigned to the selected list, were accessed comprises: updating a position of the accessed cache block within the order indicated by the selected list.

In Example 13, the method of any one of Examples 1 to 12, wherein updating the order in which the cache blocks, assigned to the selected list, were accessed comprises: updating a position of the accessed cached block to a head position within the order indicated by the selected list.

In Example 14, the method of any one of Examples 1 to 13, further comprising: returning a cache block from the cache memory using a list of the plurality of lists.

In Example 15, the method of any one of Examples 1 to 14, further comprising: returning a cache block from the cache memory using the selected list indicating the updated order.

In Example 16, the method of any one of Examples 1 to 15, further comprising: partitioning the cache memory into the plurality of cache portions such that each of the cache portions are of equal size.

In Example 17, the method of any one of Examples 1 to 16, further comprising: determining a list for an eviction process from the plurality of lists based on an order of eviction.

In Example 18, the method of Example 17, further comprising: evicting a cache block from the determined list based on the order of eviction.

In Example 19, the method of any one of Examples 1 to 18, further comprising: determining a list for an eviction process from the plurality of lists based on a predetermined order of eviction.

In Example 20, the method of Example 19, further comprising: evicting a cache block from the determined list based on the predetermined order of eviction.

In Example 21, the method of any one of Examples 1 to 20, further comprising: determining a list for an eviction process from the plurality of lists based on a sequential order of eviction.

In Example 22, the method of Example 21, further comprising: evicting a cache block from the determined list based on the sequential order of eviction.

In Example 23, the method of any one of Examples 1 to 22, further comprising: determining a list for an eviction process from the plurality of lists based on a non-sequential order of eviction.

In Example 24, the method of Example 23, further comprising: evicting a cache block from the determined list based on the non-sequential order of eviction.

In Example 25, the method of any one of Examples 1 to 24, further comprising: determining a list for an eviction process from the plurality of lists based on a comparison of a size of the determined list and a threshold list size.

In Example 26, the method of Example 25, further comprising: evicting a cache block from determined list based on the comparison of the size of the determined list and the threshold list size.

In Example 27, the method of any one of Examples 1 to 26, further comprising: determining a list for an eviction process from the plurality of lists based on a comparison of a size of the determined list and a predetermined threshold list size.

In Example 28, the method of Example 27, further comprising: evicting a cache block from the determined list based on the comparison of the size of the determined list and the predetermined threshold list size.

In Example 29, the method of any one of Examples 1 to 28, further comprising: determining a list for an eviction process from the plurality of lists based on a comparison of a size of the determined list and a variable threshold list size.

In Example 30, the method of Example 29, further comprising: evicting a cache block from the determined list based on the comparison of the size of the determined list and the variable threshold list size.

In Example 31, the method of any one of Examples 1 to 30, further comprising: determining a position of a candidate cache block for an eviction process within the order indicated by a list among the plurality of lists to which the candidate cache block is assigned.

In Example 32, the method of Example 31, further comprising: evicting the candidate cache block from the list to which the candidate cache block is assigned based on the determined position of the candidate cache block.

In Example 33, the method of any one of Examples 1 to 32, further comprising: determining a position of a candidate cache block within the order indicated by a list among the plurality of lists to which the candidate cache block is assigned.

In Example 34, the method of Example 33, further comprising: evicting the candidate cache block from the list to which the candidate cache block is assigned in response to determining the position of the candidate cache block is a tail position.

In Example 35, a device for caching data accessed in a storage device, the device comprising: a cache memory comprising a plurality of cache portions including a first cache portion and a second cache portion; and a cache memory controller configured to select a list from among a first list and a second list based on a cache block accessed from the cache memory, the first list being assigned to the first cache portion and the second list being assigned to the second cache portion, the first list indicating an order in which cache blocks of the first portion were accessed, the second list indicating an order in which cache blocks of the second portion were accessed, and update the order in which the cache blocks, assigned to the selected list, were accessed based on the accessed cache block.

In Example 36, a device for caching data accessed in a storage device, the device comprising: a cache memory partitioned into a plurality of cache portions; and a cache memory controller configured to select a list from a plurality of lists based on a cache block accessed from a cache memory, each of the plurality of lists being assigned to a respective cache portion of the plurality of cache portions, each of the plurality of lists indicating an order in which cache blocks of the respective cache portion were accessed, and update the order in which the cache blocks, assigned to the selected list, were accessed based on the accessed cache block.

In Example 37, the device of any one of Examples 35 or 36, wherein the cache memory controller is configured to select the list from the plurality of lists by: determining an address of the accessed cache block in the cache memory.

In Example 38, the device of Example 37, wherein the cache memory controller is further configured to select the list from the plurality of lists based on the determined address of the accessed cache block.

In Example 39, the device of any one of Examples 35 to 38, wherein the cache memory controller is configured to select the list from the plurality of lists by: determining an address of the accessed cache block in the cache memory is within a table.

In Example 40, the device of Example 39, wherein the cache memory controller is further configured to select the list from the plurality of lists based on determining the address of the accessed cache block within the table.

In Example 41, the device of any one of Examples 35 to 40, wherein the cache memory controller is configured to select the list from the plurality of lists by: determining an address of the accessed cache block in the cache memory is associated with the selected list within a table.

In Example 42, the device of Example 41, wherein the cache memory controller is further configured to select the list from the plurality of lists based on determining the address of the accessed cache block is associated with the selected list.

In Example 43, the device of any one of Examples 35 to 42, wherein the cache memory controller is configured to select the list from the plurality of lists by: determining an address of the accessed cache block in the cache memory is associated with the selected list within a look-up table.

In Example 44, the device of Example 43, wherein the cache memory controller is further configured to select the list from the plurality of lists based on determining the address of the accessed cache block is associated with the selected list.

In Example 45, the device of any one of Examples 35 to 44, wherein the cache memory controller is configured to update the order in which the cache blocks, assigned to the selected list, were accessed in response to the cache block being accessed.

In Example 46, the device of any one of Examples 35 to 45, wherein the cache memory controller is configured to update the order in which the cache blocks, assigned to the selected list, were accessed by: updating a position of the accessed cache block within the order indicated by the selected list.

In Example 47, the device of any one of Examples 35 to 46, wherein the cache memory controller is configured to update the order in which the cache blocks, assigned to the selected list, were accessed by: updating a position of the accessed cached block to a head position within the order indicated by the selected list.

In Example 48, the device of any one of Examples 35 to 47, wherein the cache memory controller is further configured to: return a cache block from the cache memory using one of the plurality of lists.

In Example 49, the device of any one of Examples 35 to 48, wherein the cache memory controller is further configured to: return a cache block from the cache memory using the selected list indicating the updated order.

In Example 50, the device of any one of Examples 35 to 49, wherein the cache memory controller is further configured to: partition the cache memory into the plurality of cache portions such that each of the cache portions are of equal size.

In Example 51, the device of any one of Examples 35 to 50, wherein the cache memory controller is further configured to: determine a list for an eviction process from the plurality of lists based on an order of eviction.

In Example 52, the device of Example 51, wherein the cache memory controller is further configured to: evict a cache block from the determined list based on the order of eviction.

In Example 53, the device of Example 36, wherein the cache memory controller is further configured to: determine a list for an eviction process from the plurality of lists based on a predetermined order of eviction.

In Example 54, the device of Example 53, wherein the cache memory controller is further configured to: evict a cache block from the determined list based on the predetermined order of eviction.

In Example 55, the device of any one of Examples 35 to 54, wherein the cache memory controller is further configured to: determine a list for an eviction process from the plurality of lists based on a sequential order of eviction.

In Example 56, the device of Example 55, wherein the cache memory controller is further configured to: evict a cache block from the determined list based on the sequential order of eviction.

In Example 57, the device of any one of Examples 35 to 56, wherein the cache memory controller is further configured to: determine a list for an eviction process from the plurality of lists based on a non-sequential order of eviction.

In Example 58, the device of Example 57, wherein the cache memory controller is further configured to: evict a cache block from the determined list based on the non-sequential order of eviction.

In Example 59, the device of any one of Examples 35 to 58, wherein the cache memory controller is further configured to: determine a list for an eviction process from the plurality of lists based on a comparison of a size of the determined list and a threshold list size.

In Example 60, the device of Example 59, wherein the cache memory controller is further configured to: evict a cache block from determined list based on the comparison of the size of the determined list and the threshold list size.

In Example 61, the device of any one of Examples 35 to 60, wherein the cache memory controller is further configured to: determine a list for an eviction process from the plurality of lists based on a comparison of a size of the determined list and a predetermined threshold list size.

In Example 62, the device of Example 61, wherein the cache memory controller is further configured to: evict a cache block from the determined list based on the comparison of the size of the determined list and the predetermined threshold list size.

In Example 63, the device of any one of Examples 35 to 62, wherein the cache memory controller is further configured to: determine a list for an eviction process from the plurality of lists based on a comparison of a size of the determined list and a variable threshold list size.

In Example 64, the device of Example 63, wherein the cache memory controller is further configured to: evict a cache block from the determined list based on the comparison of the size of the determined list and the variable threshold list size.

In Example 65, the device of any one of Examples 35 to 64, wherein the cache memory controller is further configured to: determine a position of a candidate cache block for an eviction process within the order indicated by a list among the plurality of lists to which the candidate cache block is assigned.

In Example 66, the device of Example 65, wherein the cache memory controller is further configured to: evict the candidate cache block from the list to which the candidate cache block is assigned based on the determined position of the candidate cache block.

In Example 67, the device of any one of Examples 35 to 66, wherein the cache memory controller is further configured to: determine a position of a candidate cache block within the order indicated by a list among the plurality of lists to which the candidate cache block is assigned.

In Example 68, the device of Example 67, wherein the cache memory controller is further configured to: evict the candidate cache block from the list to which the candidate cache block is assigned in response to determining the position of the candidate cache block is a tail position.

In Example 69, a method for caching data accessed in a storage device, the method comprising: determining whether a block to be accessed from a storage device is a cache block stored in a cache memory, the cache memory having assigned thereto a list indicating an order in which cache blocks were accessed from the cache memory; determining whether the block meets a list update criteria in response to determining the block is a cache block among the cache blocks stored in the cache memory; and updating the order, indicated by the list, in which the cache blocks were accessed from the cache memory in response to determining the block meets the list update criteria.

In Example 70, the method of Example 69, wherein determining whether the block is the cache block stored in the cache memory comprises: determining an address of the block in the cache memory.

In Example 71, the method of any one of Examples 69 or 70, wherein determining whether the block is the cache block stored in the cache memory comprises: determining an address of the block in the cache memory is within a table.

In Example 72, the method of any one of Examples 69 to 71, wherein determining whether the block is the cache block stored in the cache memory comprises: determining an address of the block in the cache memory is associated with the list within a table.

In Example 73, the method of any one of Examples 69 to 72, wherein determining whether the block is the cache block stored in the cache memory comprises: determining an address of the block in the cache memory is associated with the list within a look-up table.

In Example 74, the method of any one of Examples 69 to 73, wherein determining whether the block meets the list update criteria comprises: determining whether the block was previously accessed within a threshold number of updates to the list.

In Example 75, the method of any one of Examples 69 to 74, wherein determining whether the block meets the list update criteria comprises: comparing a timestamp value associated with the block with a threshold number of updates to the list.

In Example 76, the method of Example 75, wherein determining whether the block meets the list update criteria comprises: determining the block meets the list update criteria based on the timestamp value being greater than or equal to the threshold number of updates.

In Example 77, the method of any one of Examples 69 to 76, further comprising: modifying a count value when access to a respective cache block of the cache blocks causes the order to be updated; and associating the modified count value with the respective cache block of the cache blocks, which caused the list to be updated, wherein determining whether the block meets the list update criteria comprises: comparing the modified count value associated with the block with a threshold number of updates to the list.

In Example 78, the method of Example 77, wherein determining whether the block meets the list update criteria further comprises: determining the block meets the list update criteria based on the modified count value being greater than or equal to the threshold number of updates.

In Example 79, the method of any one of Examples 77 or 78, further comprising: setting the modified count value to a timestamp value associated with the respective cache block of the cache blocks, which caused the list to be updated, wherein determining whether the block meets the list update criteria further comprises: comparing the timestamp value associated with the block with a threshold number of updates to the list.

In Example 80, the method of Example 79, wherein determining whether the block meets the list update criteria comprises: determining the block meets the list update criteria based on the timestamp value being greater than or equal to the threshold number of updates.

In Example 81, the method of any one of Examples 69 to 80, wherein updating the order in which the cache blocks were accessed comprises: updating a position of the block within the order indicated by the list.

In Example 82, the method of any one of Examples 69 to 81, wherein updating the order in which the cache blocks were accessed comprises: updating a position of the block to a head position within the order indicated by the list.

In Example 83, the method of any one of Examples 69 to 82, further comprising: returning a cache block from the cache memory using one of a plurality of lists, wherein the cache memory comprises a plurality of cache portions, each list of the plurality of lists being assigned to a respective cache portion of the plurality of cache portions, each list indicating an order in which cache blocks of the respective portion were accessed.

In Example 84, the method of any one of Examples 69 to 83, further comprising: returning a cache block from the cache memory using the list indicating the updated order.

In Example 85, the method of any one of Examples 69 to 84, further comprising: partitioning the cache memory into a plurality of cache portions such that each of the cache portions are of equal size.

In Example 86, the method of Example 83, further comprising: determining a list for an eviction process from the plurality of lists based on an order of eviction.

In Example 87, the method of Example 86, further comprising: evicting a cache block from the determined list based on the order of eviction.

In Example 88, the method of Example 83, further comprising: determining a list for an eviction process from the plurality of lists based on a predetermined order of eviction.

In Example 89, the method of Example 88, further comprising: evicting a cache block from the determined list based on the predetermined order of eviction.

In Example 90, the method of Example 83, further comprising: determining a list for an eviction process from the plurality of lists based on a sequential order of eviction.

In Example 91, the method of Example 90, further comprising: evicting a cache block from the determined list based on the sequential order of eviction.

In Example 92, the method of Example 83, further comprising: determining a list for an eviction process from the plurality of lists based on a non-sequential order of eviction.

In Example 93, the method of Example 92, further comprising: evicting a cache block from the determined list based on the non-sequential order of eviction.

In Example 94, the method of Example 83, further comprising: determining a list for an eviction process from the plurality of lists based on a comparison of a size of the determined list and a threshold list size.

In Example 95, the method of Example 94, further comprising: evicting a cache block from determined list based on the comparison of the size of the determined list and the threshold list size.

In Example 96, the method of Example 83, further comprising: determining a list for an eviction process from the plurality of lists based on a comparison of a size of the determined list and a predetermined threshold list size.

In Example 97, the method of Example 96, further comprising: evicting a cache block from the determined list based on the comparison of the size of the determined list and the predetermined threshold list size.

In Example 98, the method of Example 83, further comprising: determining a list for an eviction process from the plurality of lists based on a comparison of a size of the determined list and a variable threshold list size.

In Example 99, the method of Example 98, further comprising: evicting a cache block from the determined list based on the comparison of the size of the determined list and the variable threshold list size.

In Example 100, the method of Example 83, further comprising: determining a position of a candidate cache block for an eviction process within the order indicated by a list among the plurality of lists to which the candidate cache block is assigned.

In Example 101, the method of Example 100, further comprising: evicting the candidate cache block from the list to which the candidate cache block is assigned based on the determined position of the candidate cache block.

In Example 102, the method of Example 83, further comprising: determining a position of a candidate cache block within the order indicated by a list among the plurality of lists to which the candidate cache block is assigned.

In Example 103, the method of Example 102, further comprising: evicting the candidate cache block from the list to which the candidate cache block is assigned in response to determining the position of the candidate cache block is a tail position.

In Example 104, the method of Example 102, further comprising: evicting the candidate cache block from the list to which the candidate cache block is assigned in response to determining the position of the candidate cache block is referenced by a tail position of the list.

In Example 105, a device for caching data, the device comprising: a cache memory storing a plurality of cache blocks, the cache memory having assigned thereto a list indicating an order in which the cache blocks were accessed from the cache memory; and a cache memory controller configured to determine whether a block to be accessed from a storage device is a cache block stored in the cache memory; determine whether the block meets a list update criteria in response to determining the block is a cache block among the cache blocks stored in the cache memory; and update the order, indicated by the list, in which the cache blocks were accessed from the cache memory in response to determining the block meets the list update criteria.

In Example 106, the device of Example 105, wherein the cache memory controller is configured to determine whether the block is the cache block stored in the cache memory by: determining an address of the block in the cache memory.

In Example 107, the device of any one of Examples 105 or 106, wherein the cache memory controller is configured to determine whether the block is the cache block stored in the cache memory by: determining an address of the block in the cache memory is within a table.

In Example 108, the device of any one of Examples 105 to 107, wherein the cache memory controller is configured determine whether the block is the cache block stored in the cache memory by: determining an address of the block in the cache memory is associated with the list within a table.

In Example 109, the device of any one of Examples 105 to 108, wherein the cache memory controller is configured to determine whether the block is the cache block stored in the cache memory by: determining an address of the block in the cache memory is associated with the list within a look-up table.

In Example 110, the device of any one of Examples 105 to 109, wherein the cache memory controller is configured to determine whether the block meets the list update criteria by: determining whether the block was previously accessed within a threshold number of updates to the list.

In Example 111, the method of any one of Examples 105 to 110, wherein the cache memory controller is configured to determine whether the block meets the list update criteria by: comparing a timestamp value associated with the block with a threshold number of updates to the list.

In Example 112, the device of Example 111, wherein the cache memory controller is configured to determine whether the block meets the list update criteria based on the timestamp value being greater than or equal to the threshold number of updates.

In Example 113, the device of any one of Examples 105 to 112, wherein the cache memory controller is configured to: modify a count value when access to a respective cache block of the cache blocks causes the order to be updated; and associate the modified count value with the respective cache block of the cache blocks, which caused the list to be updated, and the cache memory controller is further configured to determine whether the accessed cache block meets the list update criteria by: comparing the modified count value associated with the block with a threshold number of updates to the list.

In Example 114, the device of Example 113, wherein the cache memory controller is configured to determine whether the block meets the list update criteria based on the modified count value being greater than or equal to the threshold number of updates.

In Example 115, the device of any one of Examples 113 or 114, wherein the cache memory controller is configured to set the modified count value to a timestamp value associated with the respective cache block of the cache blocks, which caused the list to be updated, and the cache memory controller is further configured to determine whether the block meets the list update criteria by comparing the timestamp value associated with the block with a threshold number of updates to the list.

In Example 116, the device of Example 115, wherein the cache memory controller is configured to determine whether the block meets the list update criteria based on the timestamp value being greater than or equal to the threshold number of updates.

In Example 117, the device of any one of Examples 105 to 116, wherein the cache memory controller is configured to update the order in which the cache blocks were accessed by: updating a position of the block within the order indicated by the list.

In Example 118, the device of any one of Examples 105 to 117, wherein the cache memory controller is configured to update the order in which the cache blocks were accessed by: updating a position of the block to a head position within the order indicated by the list.

In Example 119, the device of any one of Examples 105 to 118, wherein the cache memory controller is configured to return a cache block from the cache memory using one of a plurality of lists, and the cache memory comprises a plurality of cache portions, each list of the plurality of lists being assigned to a respective cache portion of the plurality of cache portions, each list indicating an order in which cache blocks of the respective cache portion were accessed.

In Example 120, the device of any one of Examples 105 to 119, wherein the cache memory controller is configured to: return a cache block from the cache memory using the list indicating the updated order.

In Example 121, the device of any one of Examples 105 to 120, wherein the cache memory controller is configured to: partition the cache memory into a plurality of cache portions such that each of the cache portions are of equal size.

In Example 122, the device of Example 119, wherein the cache memory controller is configured to: determine a list for an eviction process from the plurality of lists based on an order of eviction.

In Example 123, the device of Example 122, wherein the cache memory controller is configured to: evict a cache block from the determined list based on the order of eviction.

In Example 124, the device of Example 119, wherein the cache memory controller is configured to: determine a list for an eviction process from the plurality of lists based on a predetermined order of eviction.

In Example 125, the device of Example 124, wherein the cache memory controller is configured to: evict a cache block from the determined list based on the predetermined order of eviction.

In Example 126, the device of Example 119, wherein the cache memory controller is configured to: determine a list for an eviction process from the plurality of lists based on a sequential order of eviction.

In Example 127, the device of Example 126, wherein the cache memory controller is configured to: evict a cache block from the determined list based on the sequential order of eviction.

In Example 128, the device of Example 119, wherein the cache memory controller is configured to: determine a list for an eviction process from the plurality of lists based on a non-sequential order of eviction.

In Example 129, the device of Example 128, wherein the cache memory controller is configured to: evict a cache block from the determined list based on the non-sequential order of eviction.

In Example 130, the device of Example 119, wherein the cache memory controller is configured to: determine a list for an eviction process from the plurality of lists based on a comparison of a size of the determined list and a threshold list size.

In Example 131, the device of Example 130, wherein the cache memory controller is configured to: evict a cache block from determined list based on the comparison of the size of the determined list and the threshold list size.

In Example 132, the device of Example 119, wherein the cache memory controller is configured to: determine a list for an eviction process from the plurality of lists based on a comparison of a size of the determined list and a predetermined threshold list size.

In Example 133, the device of Example 132, wherein the cache memory controller is configured to: evict a cache block from the determined list based on the comparison of the size of the determined list and the predetermined threshold list size.

In Example 134, the device of Example 119, wherein the cache memory controller is configured to: determine a list for an eviction process from the plurality of lists based on a comparison of a size of the determined list and a variable threshold list size.

In Example 135, the device of Example 134, wherein the cache memory controller is configured to: evict a cache block from the determined list based on the comparison of the size of the determined list and the variable threshold list size.

In Example 136, the device of Example 119, wherein the cache memory controller is configured to: determine a position of a candidate cache block for an eviction process within the order indicated by a list among the plurality of lists to which the candidate cache block is assigned.

In Example 137, the device of Example 136, wherein the cache memory controller is configured to: evict the candidate cache block from the list to which the candidate cache block is assigned based on the determined position of the candidate cache block.

In Example 138, the device of Example 119, wherein the cache memory controller is configured to: determine a position of a candidate cache block within the order indicated by a list among the plurality of lists to which the candidate cache block is assigned.

In Example 139, the device of Example 138, wherein the cache memory controller is configured to: evict the candidate cache block from the list to which the candidate cache block is assigned in response to determining the position of the candidate cache block is a tail position.

In Example 140, a method for caching data accessed in a storage device, the method comprising: selecting a list from among a first list and a second list based on a cache block accessed from a cache memory, the cache memory comprising a plurality of cache portions including a first cache portion and a second cache portion, the first list being assigned to the first cache portion and the second list being assigned to the second cache portion, the first list indicating an order in which cache blocks of the first cache portion were accessed, the second list indicating an order in which cache blocks of the second cache portion were accessed; determining whether the accessed block meets a list update criteria; and updating the order in which cache blocks, assigned to the selected list, were accessed from the cache memory based on determining the accessed cache block meets the list update criteria.

In Example 141, a method for caching data accessed in a storage device, the method comprising: selecting a list from a plurality of lists based on a cache block accessed from a cache memory, the cache memory being partitioned into a plurality of cache portions, each of the plurality of lists being assigned to a respective cache portion of the plurality of cache portions, each of the plurality of lists indicating an order in which cache blocks of the respective cache portion were accessed; determining whether the accessed cache block meets a list update criteria; and updating the order in which cache blocks, assigned to the selected list, were accessed from the cache memory based on determining the accessed cache block meets the list update criteria.

In Example 142, the method of any one of Examples 140 or 141, wherein selecting the list from the plurality of lists comprises: determining an address of the accessed cache block in the cache memory.

In Example 143, the method of Example 142, wherein selecting the list from the plurality of lists further comprises: selecting the list from the plurality of lists based on the determined address of the accessed cache block.

In Example 144, the method of any one of Examples 140 to 143, wherein selecting the list from the plurality of lists comprises: determining whether an address of the accessed cache block in the cache memory is within a table.

In Example 145, the method of Example 144, wherein selecting the list from the plurality of lists further comprises: selecting the list from the plurality of lists based on determining the address of the accessed cache block within the table.

In Example 146, the method of any one of Examples 140 to 145, wherein selecting the list from the plurality of lists comprises: determining whether an address of the accessed cache block in the cache memory is associated with the selected list within a table.

In Example 147, the method of Example 146, wherein selecting the list from the plurality of lists further comprises: selecting the list from the plurality of lists based on determining the address of the accessed cache block is associated with the selected list.

In Example 148, the method of any one of Examples 140 to 147, wherein selecting the list from the plurality of lists comprises: determining whether an address of the accessed cache block in the cache memory is associated with the selected list within a look-up table.

In Example 149, the method of Example 148, wherein selecting the list from the plurality of lists further comprises: selecting the list from the plurality of lists based on determining the address of the accessed cache block is associated with the selected list.

In Example 150, the method of any one of Examples 140 to 149, wherein determining whether the accessed cache block meets the list update criteria comprises: determining whether the accessed cache block was previously accessed within a threshold number of updates to the selected list.

In Example 151, the method of any one of Examples 140 to 150, wherein determining whether the accessed cache block meets the list update criteria comprises: comparing a timestamp value associated with the accessed cache block with a threshold number of updates to the selected list.

In Example 152, the method of Example 151, wherein determining whether the accessed cache block meets the list update criteria comprises: determining the accessed cache block meets the list update criteria based on the timestamp value being greater than or equal to the threshold number of updates.

In Example 153, the method of any one of Examples 140 to 152, further comprising: modifying a count value each time access to a respective cache block of the cache blocks, causes the order of the selected list to be updated; and associating the modified count value with the respective cache block of the cache blocks, which caused the selected list to be updated, wherein determining whether the accessed cache block meets the list update criteria comprises: comparing the modified count value associated with the accessed cache block with a threshold number of updates to the selected list.

In Example 154, the method of Example 153, wherein determining whether the accessed cache block meets the list update criteria further comprises: determining the accessed cache block meets the list update criteria based on the modified count value being greater than or equal to the threshold number of updates.

In Example 155, the method of any one of Examples 153 or 154, further comprising: setting the modified count value to a timestamp value associated with the respective cache block of the cache blocks, which caused the selected list to be updated, wherein determining whether the accessed cache block meets the list update criteria further comprises: comparing the timestamp value associated with the accessed cache block with a threshold number of updates to the selected list.

In Example 156, the method of Example 155, wherein determining whether the accessed cache block meets the list update criteria comprises: determining the accessed cache block meets the list update criteria based on the timestamp value being greater than or equal to the threshold number of updates.

In Example 157, the method of any one of Examples 140 to 156, wherein updating the order in which the cache blocks, assigned to the selected list, were accessed comprises: updating the order in which the cache blocks, assigned to the selected list, were accessed in response to the cache block being accessed.

In Example 158, the method of any one of Examples 140 to 157, wherein updating the order in which the cache blocks, assigned to the selected list, were accessed comprises: updating a position of the accessed cache block within the order indicated by the selected list.

In Example 159, the method of any one of Examples 140 to 158, wherein updating the order in which the cache blocks, assigned to the selected list, were accessed comprises: updating a position of the accessed cached block to a head position within the order indicated by the selected list.

In Example 160, the method of any one of Examples 140 to 159, further comprising: returning a cache block from the cache memory using a list of the plurality of lists.

In Example 161, the method of any one of Examples 140 to 160, further comprising: returning a cache block from the cache memory using the selected list indicating the updated order.

In Example 162, the method of any one of Examples 140 to 161, further comprising: partitioning the cache memory into the plurality of cache portions such that each of the cache portions are of equal size.

In Example 163, the method of any one of Examples 140 to 162, further comprising: determining a list for an eviction process from the plurality of lists based on an order of eviction.

In Example 164, the method of Example 163, further comprising: evicting a cache block from the determined list based on the order of eviction.

In Example 165, the method of any one of Examples 140 to 164, further comprising: determining a list for an eviction process from the plurality of lists based on a predetermined order of eviction.

In Example 166, the method of Example 165, further comprising: evicting a cache block from the determined list based on the predetermined order of eviction.

In Example 167, the method of any one of Examples 140 to 166, further comprising: determining a list for an eviction process from the plurality of lists based on a sequential order of eviction.

In Example 168, the method of Example 167, further comprising: evicting a cache block from the determined list based on the sequential order of eviction.

In Example 169, the method of any one of Examples 140 to 168, further comprising: determining a list for an eviction process from the plurality of lists based on a non-sequential order of eviction.

In Example 170, the method of Example 169, further comprising: evicting a cache block from the determined list based on the non-sequential order of eviction.

In Example 171, the method of any one of Examples 140 to 170, further comprising: determining a list for an eviction process from the plurality of lists based on a comparison of a size of the determined list and a threshold list size.

In Example 172, the method of Example 171, further comprising: evicting a cache block from determined list based on the comparison of the size of the determined list and the threshold list size.

In Example 173, the method of any one of Examples 140 to 172, further comprising: determining a list for an eviction process from the plurality of lists based on a comparison of a size of the determined list and a predetermined threshold list size.

In Example 174, the method of Example 173, further comprising: evicting a cache block from the determined list based on the comparison of the size of the determined list and the predetermined threshold list size.

In Example 175, the method of any one of Examples 140 to 174, further comprising: determining a list for an eviction process from the plurality of lists based on a comparison of a size of the determined list and a variable threshold list size.

In Example 176, the method of Example 175, further comprising: evicting a cache block from the determined list based on the comparison of the size of the determined list and the variable threshold list size.

In Example 177, the method of any one of Examples 140 to 176, further comprising: determining a position of a candidate cache block for an eviction process within the order indicated by a list among the plurality of lists to which the candidate cache block is assigned.

In Example 178, the method of Example 177, further comprising: evicting the candidate cache block from the list to which the candidate cache block is assigned based on the determined position of the candidate cache block.

In Example 179, the method of any one of Examples 140 to 178, further comprising: determining a position of a candidate cache block within the order indicated by a list among the plurality of lists to which the candidate cache block is assigned.

In Example 180, the method of Example 179, further comprising: evicting the candidate cache block from the list to which the candidate cache block is assigned in response to determining the position of the candidate cache block is a tail position.

In Example 181, a device for caching data accessed in a storage device, the device comprising: a cache memory partitioned into a plurality of cache portions including a first cache portion and a second cache portion; and a cache memory controller configured to select a list from among a first list and a second list based on a cache block accessed from the cache memory, the first list being assigned to the first cache portion and the second list being assigned to the second cache portion, the first list indicating an order in which cache blocks of the first cache portion were accessed, the second list indicating an order in which cache blocks of the second cache portion were accessed; and determine whether the accessed cache block meets a list update criteria; and update the order in which the cache blocks, assigned to the selected list, were accessed from the cache memory based on determining the accessed cache block meets the list update criteria.

In Example 182, t device for caching data accessed in a storage device, the device comprising: a cache memory partitioned into a plurality of cache portions; and a cache memory controller configured to select a list from a plurality of lists based on a cache block being accessed from a cache memory, each of the plurality of lists being assigned to a respective cache portion of the plurality of cache portions, each of the plurality of lists indicating an order in which cache blocks of the respective portion were accessed; determine whether the accessed cache block meets a list update criteria; and update the order in which the cache blocks, assigned to the selected list, were accessed from the cache memory based on determining the accessed cache block meets the list update criteria.

In Example 183, the device of any one of Examples 181 or 182, wherein the cache memory controller is configured to select the list from the plurality of lists by: determining an address of the accessed cache block in the cache memory.

In Example 184, the device of Example 183, wherein the cache memory controller is further configured to select the list from the plurality of lists based on the determined address of the accessed cache block.

In Example 185, the device of any one of Examples 181 to 184, wherein the cache memory controller is configured to select the list from the plurality of lists by: determining whether an address of the accessed cache block in the cache memory is within a table.

In Example 186, the device of Example 185, wherein the cache memory controller is further configured to select the list from the plurality of lists based on determining the address of the accessed cache block within the table.

In Example 187, the device of any one of Examples 181 to 186, wherein the cache memory controller is configured to select the list from the plurality of lists by: determining whether an address of the accessed cache block in the cache memory is associated with the selected list within a table.

In Example 188, the device of Example 187, wherein the cache memory controller is further configured to select the list from the plurality of lists based on determining the address of the accessed cache block is associated with the selected list.

In Example 189, the device of any one of Examples 181 to 188, wherein the cache memory controller is configured to select the list from the plurality of lists by: determining whether an address of the accessed cache block in the cache memory is associated with the selected list within a look-up table.

In Example 190, the device of Example 189, wherein the cache memory controller is further configured to select the list from the plurality of lists based on determining the address of the accessed cache block is associated with the selected list.

In Example 191, the device of any one of Examples 181 to 190, wherein the cache memory controller is configured to determine whether the accessed cache block meets the list update criteria by: determining whether the accessed cache block was previously accessed within a threshold number of updates to the selected list.

In Example 192, the device of any one of Examples 181 to 191, wherein the cache memory controller is configured to determine whether the accessed cache block meets the list update criteria by: comparing a timestamp value associated with the accessed cache block with a threshold number of updates to the selected list.

In Example 193, the device of Example 192, wherein the cache memory controller is further configured to determine whether the accessed cache block meets the list update criteria by: determining the accessed cache block meets the list update criteria based on the timestamp value being greater than or equal to the threshold number of updates.

In Example 194, the device of any one of Examples 181 to 193, wherein the cache memory controller is configured to: modify a count value each time access to a respective cache block of the cache blocks, causes the order of the selected list to be updated; and associate the modified count value with the respective cache block of the cache blocks, which caused the selected list to be updated, and the cache memory controller is further configured to determine whether the accessed cache block meets the list update criteria by: comparing the modified count value associated with the accessed cache block with a threshold number of updates to the selected list.

In Example 195, the device of Example 194, wherein the cache memory controller is further configured to determine whether the accessed cache block meets the list update criteria by: determining the accessed cache block meets the list update criteria based on the modified count value being greater than or equal to the threshold number of updates.

In Example 196, the device of any one of Examples 194 or 195, wherein the cache memory controller is configured to: set the modified count value to a timestamp value associated with the respective cache block of the cache blocks, which caused the selected list to be updated, and the cache memory controller is further configured to determine whether the accessed cache block meets the list update criteria by: comparing the timestamp value associated with the accessed cache block with a threshold number of updates to the selected list.

In Example 197, the device of Example 196, wherein the cache memory controller is configured to determine whether the accessed cache block meets the list update criteria based on the timestamp value being greater than or equal to the threshold number of updates.

In Example 198, the device of any one of Examples 181 to 197, wherein the cache memory controller is configured to update the order in which the cache blocks, assigned to the selected list, were accessed in response to the cache block being accessed.

In Example 199, the device of any one of Examples 181 to 198, wherein the cache memory controller is configured to update the order in which the cache blocks, assigned to the selected list, were accessed by: updating a position of the accessed cache block within the order indicated by the selected list.

In Example 200, the device of any one of Examples 181 to 199, wherein the cache memory controller is configured to update the order in which the cache blocks, assigned to the selected list, were accessed by: updating a position of the accessed cached block to a head position within the order indicated by the selected list.

In Example 201, the device of any one of Examples 181 to 200, wherein the cache memory controller is configured to: return a cache block from the cache memory using a list of the plurality of lists.

In Example 202, the device of any one of Examples 181 to 201, wherein the cache memory controller is configured to: return a cache block from the cache memory using the selected list indicating the updated order.

In Example 203, the device of any one of Examples 181 to 202, wherein the cache memory controller is configured to: partition the cache memory into the plurality of cache portions such that each of the cache portions are of equal size.

In Example 204, the device of any one of Examples 181 to 203 wherein the cache memory controller is configured to: determine a list for an eviction process from the plurality of lists based on an order of eviction.

In Example 205, the device of Example 204, wherein the cache memory controller is configured to: evict a cache block from the determined list based on the order of eviction.

In Example 206, the device of any one of Examples 181 to 205, wherein the cache memory controller is configured to: determine a list for an eviction process from the plurality of lists based on a predetermined order of eviction.

In Example 207, the device of Example 206, wherein the cache memory controller is configured to: evict a cache block from the determined list based on the predetermined order of eviction.

In Example 208, the device of any one of Examples 181 to 205, wherein the cache memory controller is configured to: determine a list for an eviction process from the plurality of lists based on a sequential order of eviction.

In Example 209, the device of Example 208, wherein the cache memory controller is configured to: evict a cache block from the determined list based on the sequential order of eviction.

In Example 210, the device of any one of Examples 181 to 209, wherein the cache memory controller is configured to: determine a list for an eviction process from the plurality of lists based on a non-sequential order of eviction.

In Example 211, the device of Example 210, wherein the cache memory controller is configured to: evicting a cache block from the determined list based on the non-sequential order of eviction.

In Example 212, the device of any one of Examples 181 to 209, wherein the cache memory controller is configured to: determine a list for an eviction process from the plurality of lists based on a comparison of a size of the determined list and a threshold list size.

In Example 213, the device of Example 212, wherein the cache memory controller is configured to: evict a cache block from determined list based on the comparison of the size of the determined list and the threshold list size.

In Example 214, the device of any one of Examples 181 to 213, wherein the cache memory controller is configured to: determine a list for an eviction process from the plurality of lists based on a comparison of a size of the determined list and a predetermined threshold list size.

In Example 215, the device of Example 214, wherein the cache memory controller is configured to: evict a cache block from the determined list based on the comparison of the size of the determined list and the predetermined threshold list size.

In Example 216, the device of any one of Examples 181 to 215, wherein the cache memory controller is configured to: determine a list for an eviction process from the plurality of lists based on a comparison of a size of the determined list and a variable threshold list size.

In Example 217, the device of Example 216, wherein the cache memory controller is configured to: evict a cache block from the determined list based on the comparison of the size of the determined list and the variable threshold list size.

In Example 218, the device of any one of Examples 181 to 217, wherein the cache memory controller is configured to: determine a position of a candidate cache block for an eviction process within the order indicated by a list among the plurality of lists to which the candidate cache block is assigned.

In Example 219, the device of Example 218, wherein the cache memory controller is configured to: evict the candidate cache block from the list to which the candidate cache block is assigned based on the determined position of the candidate cache block.

In Example 220, the device of any one of Examples 181 to 219, wherein the cache memory controller is configured to: determine a position of a candidate cache block within the order indicated by a list among the plurality of lists to which the candidate cache block is assigned.

In Example 221, the device of Example 220, wherein the cache memory controller is configured to: evict the candidate cache block from the list to which the candidate cache block is assigned in response to determining the position of the candidate cache block is a tail position.

In Example 222, the device of Example 220, wherein the cache memory controller is configured to: evict the candidate cache block from the list to which the candidate cache block is assigned in response to determining the position of the candidate cache block is a tail position.

In Example 223, a computing device comprising processing circuitry configured to perform the method of any one of Examples 1 to 34.

In Example 224, a computing device comprising processing circuitry configured to perform the method of any one of Examples 69 to 103.

In Example 225, a computing device comprising processing circuitry configured to perform the method of any one of Examples 140 to 180.

In Example 226, a processing circuit configured to perform the method of any one of Examples 1 to 34.

In Example 227, a processing circuit configured to perform the method of any one of Examples 69 to 103.

In Example 228, a processing circuit configured to perform the method of any one of Examples 140 to 180.

In Example 229, a non-transitory computer readable medium storing instructions that when executed by a processor cause the processor to perform the method of any one of Examples 1 to 20.

In Example 230, a non-transitory computer readable medium storing instructions that when executed by a processor cause the processor to perform the method of any one of Examples 69 to 103.

In Example 231, a non-transitory computer readable medium storing instructions that when executed by a processor cause the processor to perform the method of any one of Examples 140 to 180.

In Example 232, a non-transitory computer readable medium storing instructions that when executed by processing circuitry of a computing device cause the computing device to perform the method of any one of Examples 1 to 20.

In Example 233, a non-transitory computer readable medium storing instructions that when executed by processing circuitry of a computing device cause the computing device to perform the method of any one of Examples 69 to 103.

In Example 234, a non-transitory computer readable medium storing instructions that when executed by processing circuitry of a computing device cause the computing device to perform the method of any one of Examples 140 to 180.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The terminology used herein is for the purpose of describing particular example aspects only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example aspects.

While the disclosure has been particularly shown and described with reference to specific aspects, it should be understood by those skilled in the art that various changes in form and detail may be made therein without departing from the spirit and scope of the disclosure as defined by the appended claims. The various aspects of this disclosure are not necessarily mutually exclusive, as some aspects of this disclosure can be combined with one or more other aspects of this disclosure to form new aspects. The scope of the disclosure is thus indicated by the appended claims and all changes which come within the meaning and range of equivalency of the claims are therefore intended to be embraced.

What is claimed is:

1. A method for caching data accessed in a storage device, the method comprising:
    selecting a list from a plurality of lists based on a cache block accessed from a cache memory, the cache memory being partitioned into a plurality of cache portions, each of the plurality of lists being assigned to a respective cache portion of the plurality of cache portions, each of the plurality of lists indicating an order in which cache blocks of the respective cache portion were accessed;
    determining whether the accessed cache block meets a list update criteria based on a count value of the selected list, a count value of the accessed cache block, and a threshold number of updates to the selected list;
    updating the order in which cache blocks, assigned to the selected list, were accessed from the cache memory based on determining the accessed cache block meets the list update criteria; and
    modifying the count value of the selected list only when the order of the selected list is updated,
    wherein the count value of the selected list represents a number of times the selected list has been updated based on access to the cache blocks ordered by the selected list.

2. The method of claim 1, wherein selecting the list from the plurality of lists comprises:
    determining whether an address of the accessed cache block in the cache memory is associated with the selected list within a look-up table.

3. The method of claim 2, wherein selecting the list from the plurality of lists further comprises:
    selecting the list from the plurality of lists based on determining the address of the accessed cache block is associated with the selected list.

4. The method of claim 1, further comprising:
    setting the count value of the accessed cache block to the modified count value, when the accessed cache block causes the order of the selected list to be updated.

5. The method of claim 1, further comprising:
    determining the count value of the accessed cache block.

6. The method of claim 5, wherein determining whether the accessed cache block meets the list update criteria comprises:
    comparing the difference between the count value of the selected list and the count value of the accessed cache block to the threshold number of updates.

7. The method of claim 6,
    wherein the count value of the selected list and the count value of the accessed cache block are timestamp values.

8. The method of claim 1, wherein updating the order in which the cache blocks, assigned to the selected list, were accessed comprises:
    updating a position of the accessed cached block to a head position within the order indicated by the selected list.

9. The method of claim 1, further comprising:
    returning a cache block from the cache memory based on the selected list indicating the updated order.

10. The method of claim 1, further comprising:
    determining a list for an eviction process from the plurality of lists based on an order of eviction.

11. The method of claim 10, further comprising:
    evicting a cache block from the determined list based on the order of eviction.

12. The method of claim 1, further comprising:
    triggering a control scheme in which the threshold number of updates to the selected list is dynamically adjusted in response to the detection of one or more events.

13. The method of claim 1, further comprising:
    triggering a control scheme in which a number of the plurality of cache portions is dynamically adjusted in response to the detection of one or more events.

14. A method for caching data accessed in a storage device, the method comprising:
    selecting a list from a plurality of lists based on a cache block accessed from a cache memory, the cache memory being partitioned into a plurality of cache portions, each of the plurality of lists being assigned to a respective cache portion of the plurality of cache portions, each of the plurality of lists indicating an order in which cache blocks of the respective cache portion were accessed;

updating the order in which the cache blocks, assigned to the selected list, were accessed based on a count value of the selected list, a count value of the accessed cache block, and a threshold number of updates to the selected list;

modifying the count value of the selected list only when access to the respective cache portion causes the order of the selected list to be updated; and returning a cache block from the cache memory based on the selected list indicating the updated order, wherein the count value of the selected list represents a number of times the selected list has been updated based on access to the cache blocks ordered by the selected list.

15. The method of claim 14, wherein selecting the list from the plurality of lists comprises:

determining an address of the accessed cache block in the cache memory.

16. The method of claim 14, further comprising:

determining a list for an eviction process from the plurality of lists based on a sequential order of eviction.

17. The method of claim 16, further comprising:

evicting a cache block from the determined list based on the sequential order of eviction.

18. A device for caching data, the device comprising:

a cache memory storing a plurality of cache blocks, the cache memory having assigned thereto a list indicating an order in which the cache blocks were accessed from the cache memory; and a cache memory controller configured to:

determine whether a block to be accessed from a storage device is a cache block stored in the cache memory, in response to determining the block is a cache block among the cache blocks stored in the cache memory, determine whether the block stored in the cache memory meets a list update criteria based on a count value of the list, a count value of the block stored in the cache memory, and a threshold number of updates to the list, update the order, indicated by the list, in which the cache blocks were accessed from the cache memory in response to determining the block stored in the cache memory meets the list update criteria, and modify the count value of the list only when the order of the list is updated, wherein the count value of the list represents a number of times the list has been updated based on access to the cache blocks ordered by the list.

19. The device of claim 18, wherein the cache memory controller is configured to return a cache block from the cache memory using one of a plurality of lists, and the cache memory comprises a plurality of cache portions, each list of the plurality of lists being assigned to a respective cache portion of the plurality of cache portions, each list indicating an order in which cache blocks of the respective cache portion were accessed.

20. The device of claim 18, wherein the cache memory controller is configured to:

partition the cache memory into a plurality of cache portions such that each of the cache portions are of equal size.

\* \* \* \* \*